United States Patent
Gupta

(10) Patent No.: US 12,060,661 B2
(45) Date of Patent: Aug. 13, 2024

(54) RECYCLED SEPARABLE MULTI-FILAMENT PARALLEL YARNS AND WOVEN FABRIC THEREOF

(71) Applicant: Ronak Rajendra Gupta, Mumbai (IN)

(72) Inventor: Ronak Rajendra Gupta, Mumbai (IN)

( * ) Notice: Subject to any disclaimer, the term of this patent is extended or adjusted under 35 U.S.C. 154(b) by 481 days.

(21) Appl. No.: 17/019,196

(22) Filed: Sep. 12, 2020

(65) Prior Publication Data

US 2020/0407889 A1    Dec. 31, 2020

Related U.S. Application Data

(60) Continuation-in-part of application No. 16/717,073, filed on Dec. 17, 2019, which is a division of
(Continued)

(51) Int. Cl.
| | | |
|---|---|---|
| *D02J 1/08* | (2006.01) | |
| *B65H 54/02* | (2006.01) | |

(Continued)

(52) U.S. Cl.
CPC .............. *D02J 1/08* (2013.01); *B65H 54/026* (2013.01); *B65H 55/005* (2013.01); *D01D 5/088* (2013.01);
(Continued)

(58) Field of Classification Search
CPC . D02J 1/08; D02J 1/02; D02G 1/0206; D02G 1/0213; D02G 1/022; D02G 1/026; D02G 1/08; D02G 1/18; D02G 3/36; D01D 5/088; D01D 5/082; D10B 2331/02; D10B 2331/04; D10B 2321/022;
(Continued)

(56) References Cited

U.S. PATENT DOCUMENTS 3,911,538 A    10/1975 Vidal et al.
3,999,361 A    12/1976 Ellis et al.
(Continued)

FOREIGN PATENT DOCUMENTS

| CN | 105970315 A | 9/2016 |
|---|---|---|
| JP | 07189065 | 7/1995 |

(Continued)

OTHER PUBLICATIONS

Cannon, c.g., 21-Filament Deformations in simultaneous Draw-Texturing by the False-Twist Method, Journal of.

*Primary Examiner* — Lynda Salvatore

(57) ABSTRACT

A high thread/yarn count woven textile fabric (800) is provided. The high thread/yarn count woven textile fabric (800) includes a plurality of warps (810), and a plurality of wefts (820). The high thread/yarn count woven textile fabric (800) having 250 to 3000 picks per inch in the weft (820) which can be extended up to 6000. Further, at least two recycled separable multi-filament parallel yarn picks are woven in groups together in the weft (820). It is provided that the recycled separable multi-filament parallel picks are separable and distinguishable from other picks very clearly. Furthermore, a denier of the recycled separable multi-filament yarn is range from 5 to 50. Usually, the thread/yarn count of woven textile fabric (800) is in between 400 to 3000 which can go up to 6000.

5 Claims, 17 Drawing Sheets

Related U.S. Application Data application No. 15/531,281, filed as application No. PCT/IB2016/058010 on Dec. 27, 2016, now Pat. No. 10,767,287.

(51) Int. Cl.

| | | |
|---|---|---|
| *B65H 55/00* | (2006.01) | |
| *D01D 5/088* | (2006.01) | |
| *D02G 1/02* | (2006.01) | |
| *D02G 1/08* | (2006.01) | |
| *D02G 1/18* | (2006.01) | |
| *D02G 3/36* | (2006.01) | |
| *D02J 1/02* | (2006.01) | |

(52) U.S. Cl.
CPC ......... *D02G 1/0206* (2013.01); *D02G 1/0213* (2013.01); *D02G 1/022* (2013.01); *D02G 1/026* (2013.01); *D02G 1/08* (2013.01); *D02G 1/18* (2013.01); *D02G 3/36* (2013.01); *D02J 1/02* (2013.01); *B65H 2701/3132* (2013.01); *D10B 2331/02* (2013.01); *D10B 2331/04* (2013.01)

(58) Field of Classification Search
CPC ...... D10B 2331/041; B65H 2701/3132; B65H 54/026; B65H 55/005; D03D 13/008; D03D 15/283; Y02P 70/62
USPC .......................................................... 428/364
See application file for complete search history.

(56) References Cited

U.S. PATENT DOCUMENTS

| | | | |
|---|---|---|---|
| 4,069,565 A | 1/1978 | Negishi et al. | |
| 4,070,817 A | 1/1978 | Bueb | |
| 4,439,903 A | 4/1984 | Matsumoto et al. | |
| 4,464,894 A | 8/1984 | Leininger | |
| 4,596,115 A | 6/1986 | Maeda et al. | |
| 4,897,989 A | 2/1990 | Gray | |
| 5,172,459 A | 12/1992 | Goineau | |
| 5,640,745 A | 6/1997 | Bertsch et al. | |
| 5,675,878 A | 10/1997 | Brown et al. | |
| 6,029,328 A | 2/2000 | Ballarati | |
| 6,481,072 B1 | 11/2002 | Hoover et al. | |
| 6,890,166 B2 | 5/2005 | Kirchhoff | |
| 7,086,130 B2 | 8/2006 | Jahns et al. | |
| 7,249,451 B2 | 7/2007 | Guidici | |
| 7,585,440 B2 | 9/2009 | Marlow | |
| 8,261,526 B2 | 9/2012 | Grassi et al. | |
| 8,317,826 B2 | 11/2012 | Park | |
| 9,131,790 B2 | 9/2015 | Argarwal | |
| 9,474,395 B2 | 10/2016 | Garg | |
| 9,481,950 B2 | 11/2016 | Argarwal | |
| 9,493,892 B1 | 11/2016 | Agarwal | |
| 9,683,318 B2 † | 6/2017 | Baumeler | |
| 10,443,159 B2 † | 10/2019 | Agarwal | |
| 10,808,337 B2 † | 10/2020 | Agarwal | |
| 10,927,482 B2 † | 2/2021 | Tanaka | |
| 2010/0119823 A1* | 5/2010 | Weiser | C08J 11/06 264/165 |
| 2011/0133011 A1* | 6/2011 | Lee | B65H 54/026 264/103 |
| 2012/0132309 A1 | 5/2012 | Morris | |
| 2013/0291286 A1 | 11/2013 | Stuckey et al. | |
| 2015/0047736 A1* | 2/2015 | Agarwal | D03D 13/008 139/435.6 |
| 2015/0259831 A1 | 9/2015 | Joumee | |
| 2016/0177478 A1 | 6/2016 | Argarwal | |
| 2016/0194791 A1 | 7/2016 | Argarwal | |
| 2016/0298270 A1 | 10/2016 | Beavers et al. | |
| 2017/0016153 A1 | 1/2017 | Argarwal | |
| 2017/0159214 A1 † | 6/2017 | Sundararajan | |

FOREIGN PATENT DOCUMENTS

| | | | |
|---|---|---|---|
| KR | 20050096575 A | | 9/2006 |
| KR | 20040118364 A | | 10/2010 |
| WO | WO 2013164791 | | 11/2013 |
| WO | 2017051395 | † | 3/2017 |

\* cited by examiner
† cited by third party

| FINAL DTY Product | 20 denier 2 Ply Parallel/Separable Texturise Yarn | | | |
|---|---|---|---|---|
| Method Used-Column Identification | Conventional – 7A1 | Present Disclosure – 7A2 | Present Disclosure – 7A3 | Present Disclosure – 7A4 |
| SPINNING PRODUCTION: | | | | |
| Reference Figure | Prior Art | Figure 4 | Figure 4A, 4B, 4C | Figure 5A |
| Machine Changes | No change | No change | No change | Increase Jets 2 times |
| Intermingling done on SPINNING machine | Low/NIL | High | High | High |
| Denier of Each Filament Yarn Ply | 32 | 32 | 32 | 32 |
| Number of Ply in Multi-Ply Separable Filament Yarn | 1 (Not Separable) | 1 | 2 | 2 |
| Total Denier of Multi-Ply Separable Filament Yarn | 32 | 32 | 64 | 64 |
| Number of Filament Yarn Packages Wound in Winder | 10 | 10 | 5 | 10 |
| POY Production per Line per day in Kgs | 153.6 | 153.6 | 153.6 | 307.2 |
| DTY PRODUCTION USING ABOVE FILAMENT YARN: | | | | |
| Reference Figure | Figure 6A | Figure 6C | Figure 6B | Figure 6B |
| Yarn from Filament Yarn Package per spindle | 1 | 2 | 1 | 1 |
| Intermingling done on Texturising machine | High | Low/NIL | Low/NIL | Low/NIL |
| Denier of Each DTY Ply | 20 | 20 | 20 | 20 |
| Number of DTY Ply in Multi-Ply Separable DTY | 2 | 2 | 2 | 2 |
| Total Denier of Multi-Ply Separable DTY Package | 40 | 40 | 40 | 40 |
| Number of DTY Bobbins Wound in Winder | 156 | 312 | 312 | 312 |
| DTY Production per Machine per day in Kgs | 748.8 | 1497.6 | 1497.6 | 1497.6 |
| Comments | Normal Production of POY and DTY | DTY Production Doubled | DTY Production Doubled | POY and DTY Production Doubled |
| Assumptions in Table Examples: • Filament Yarn POY is Produced on a Spinning Line • Polymer: Polyester Semidull • Spinning Line has 1 Winder having capacity to wind 10 Bobbins at a time, Process Speed is 3000 Meters per minute • DTY Machine has 312 Spindles and winding positions and Process Speed is 750 Meters per minute |||||

FIGURE 7A - Table (1/3)

| FINAL DTY Product | 20 denier 4 Ply Parallel/Separable Texturise Yarn | | | |
|---|---|---|---|---|
| Method Used-Column Identification | Conventional – 781 | Present Disclosure – 782 | Present Disclosure – 783 | Present Disclosure – 784 |
| SPINNING PRODUCTION: | | | | |
| Reference Figure | Figure 1 | Figure 4A, 4B, 4C | Figure 5B | Figure 5C |
| Machine Changes | No change | No change | Increase Jets 2 times | Increase Jets 4 times |
| Intermingling done on SPINNING machine | Low/NIL | High | High | High |
| Denier of Each Filament Yarn Ply | 32 | 32 | 32 | 32 |
| Number of Ply in Multi-Ply Separable Filament Yarn | 1 (Not Separable) | 2 | 4 | 4 |
| Total Denier of Multi-Ply Separable Filament Yarn | 32 | 64 | 128 | 128 |
| Number of Filament Yarn Packages Wound in Winder | 10 | 5 | 5 | 10 |
| POY Production per Line per day in Kgs | 153.6 | 153.6 | 307.2 | 614.4 |
| DTY PRODUCTION USING ABOVE FILAMENT YARN: | | | | |
| Reference Figure | Figure 6A | Figure 6C | Figure 6B | Figure 6B |
| Yarn from Filament Yarn Package per spindle | 1 | 2 | 1 | 1 |
| Intermingling done on Texturising machine | High | Low/NIL | Low/NIL | Low/NIL |
| Denier of Each DTY Ply | 20 | 20 | 20 | 20 |
| Number of DTY Ply in Multi-Ply Separable DTY | 4 | 4 | 4 | 4 |
| Total Denier of Multi-Ply Separable DTY Package | 80 | 80 | 80 | 80 |
| Number of DTY Bobbins Wound in Winder | 78 | 312 | 312 | 312 |
| DTY Production per Machine per day in Kgs | 748.8 | 2995.2 | 2995.2 | 2995.2 |
| Comments | Normal POY and DTY Production | Yarn from 2 Packages per spindle fed on DTY Machine & Production Quadrupled | POY Production Doubled and DTY Production Quadrupled | POY Production Quadrupled and DTY Production Quadrupled |
| Assumptions in Table Examples:<br>a) Filament Yarn POY is Produced on a Spinning Line<br>b) Polymer: Polyester Semidull<br>c) Spinning Line has 1 Winder having capacity to wind 10 Bobbins at a time, Process Speed is 3000 Meters per minute<br>d) DTY Machine has 312 Spindles and winding positions and Process Speed is 750 Meters per minute | | | | |

FIGURE 7B - Table (2/3)

| FINAL DTY Product | 10 denier 4 Ply Parallel/Separable Texturise Yarn | | |
|---|---|---|---|
| Method Used-Column Identification | Conventional – 7C1 | Present Disclosure – 7C2 | Present Disclosure – 7C3 |
| SPINNING PRODUCTION: | | | |
| Reference Figure | Figure 1 | Figure 5B | Figure 5C |
| Machine Changes | No change | Increase Jets 2 times | Increase Jets 4 times |
| Intermingling done on SPINNING machine | Low/NIL | High | High |
| Denier of Each Filament Yarn Ply | 16 | 16 | 16 |
| Number of Ply in Multi-Ply Separable Filament Yarn | NA | 4 | 4 |
| Total Denier of Multi-Ply Separable Filament Yarn | NA | 64 | 64 |
| Number of Filament Yarn Packages Wound in Winder | NA | 5 | 10 |
| POY Production per Line per day in Kgs | 0 | 153.6 | 307.2 |
| DTY PRODUCTION USING ABOVE FILAMENT YARN: | | | |
| Reference Figure | Figure 6A | Figure 6B | Figure 6B |
| Yarn from Filament Yarn Package per spindle | 1 | 1 | 1 |
| Intermingling done on Texturising machine | High | Low/NIL | Low/NIL |
| Denier of Each DTY Ply | 10 | 10 | 10 |
| Number of DTY Ply in Multi-Ply Separable DTY | 4 | 4 | 4 |
| Total Denier of Multi-Ply Separable DTY Package | 40 | 40 | 40 |
| Number of DTY Bobbins Wound in Winder | 78 | 312 | 312 |
| DTY Production per Machine per day in Kgs | 374.4 | 1497.6 | 1497.6 |
| Comments | POY production not possible as assumed that Melt pump can spin min 32 Denier and minimum line capacity is 150 kgs per day | POY Production Possible and DTY Production Quadrupled | POY Production Possible and doubled and DTY Production Quadrupled |
| Assumptions in Table Examples: a) Filament Yarn POY is Produced on a Spinning Line; b) Polymer: Polyester Semidull c) Spinning Line has 1 Winder having capacity to wind 10 Bobbins at a time, Process Speed is 3000 Meters per minute; d) DTY Machine has 312 Spindles and winding positions and Process Speed is 750 Meters per minute | | | |

FIGURE 7C - Table (3/3)

RECYCLED SEPARABLE MULTI-FILAMENT PARALLEL YARNS AND WOVEN FABRIC THEREOF

CROSS REFERENCE TO RELATED APPLICATIONS

The present patent application is a Continuation-in-part of Divisional patent application Ser. No. 16/717,073 filed on Dec. 17, 2019 of patent application Ser. No. 15/531,281 filed on May 26, 2017, which claims priority to International Application No. PCT/IB2016/058010, filed on Dec. 27, 2016, which claims priority to the Indian Patent Application No. 201621014375, filed on Apr. 25, 2016, all of which are herein incorporated by reference in their entirety.

Additionally, the present patent application claims the priority from the Indian Patent Application number 201923036116 filed on Sep. 7, 2019 which is a patent of addition to the Indian Patent Application No. 201621014375, filed on Apr. 25, 2016 and the present patent application also claims the priority from another Indian Patent Application number 201921036771 filed on Sep. 12, 2019. Both the patent applications (201923036116 and 201921036771) are herein incorporated by reference in their entirety.

TECHNICAL HELD

The present invention relates to the field of textiles. More particularly, the present invention relates to woven textile fabrics.

Definitions

As used in the present invention, the following term is generally intended to have the meaning as set forth below, except to the extent that the context in which they are used indicate otherwise.

"Warp" and "Weft" are terms for the two basic components used in weaving to turn thread/yarn into fabric.

Warp refers to a basic component of textile that is held stationary in tension in a frame or loom, lengthwise or longitudinally, for weaving to convert thread/yarn into a fabric.

Weft or Woof refers to another basic component of textile which is drawn through and inserted over-and-under the Warp in a transverse direction to the Warp.

A Pick or Fill refers to a single weft thread/yarn.

An end refers to a single warp thread/yarn.

Picks per inch refers to the number of the weft thread/yarns per inch of a woven textile fabric.

Ends per inch refers to the number of warp thread/yarns per inch of a woven textile.

Thread/yarn Count refers to the total number of ends and number of picks woven in the textile per square inch and is calculated by adding the total number of warp ends per inch and weft picks per inch.

High thread/yarn count refers to a thread/yarn count in the range of 400 to 3000 thread/yarns per inch.

Parallel Picks: Two or more picks that are crossing the warp simultaneously and going over and under the warp ends together. These picks are parallel to each other and can be separated from each other as they are not twisted. The parallel picks are inserted together during a weft insertion.

Parallel Ends: Two or more ends going over and under the picks together in a group. These ends can be separated from each other since they are parallel and not twisted.

BACKGROUND

Textile manufacturing industry includes conversion of fiber or filaments into yarn and from yarn to fabric that is further processed.

Conventionally, filament yarn is produced by melting and extrusion of polymer chips in an extruder or directly from polymer melt coming from a continuous polymerization plant. Polymer may be a polyester, polyamide, polypropylene, polytrimethylene terephthalate, Polybutylene terephthalate, etc. Polymer melt is pressed through holes in spinnerets to form streams that are quenched to form filaments. The filaments are grouped to form a filament yarn with desired evenness, strength, shrinkage, elongation and other properties. During the processing, the filament yarns may be oriented or drawn to form low, medium, partially, high, fully oriented or fully drawn yarn.

The filament yarns are put through an additional process called texturing or texturizing ("Texturizing Process") to give texture, crimp, bulk, strength to the filament yarn and to vary its look and feel. Textured filament yarn includes draw textured yarn and air textured yarn (together "DTY") etc. In the texturizing process, the filament yarn is given a texture either by false twisting in a false twist unit wherein twisting and de-twisting takes place or by a fluid like air. Textured yarn is mainly used in weaving and knitting of fabrics for making clothes outer/inner garments, skin-clinging garments, home furnishings, seat covers, bags upholstery, bed sheets and many other uses.

"Plying" is done by taking two or more strands of yarn (filament yarn or a textured yarn) and putting them together.

"Multi-ply yarns" as referred herein are basically two or more yarns plyed together. Each yarn in the multi-ply may be referred to as a ply. Multi-ply yarns may be untwisted or unplyed to an individual ply.

"Interlaced yarns": The yarns during processing may be passed through interlacing jets to interlace the filaments within the yarn. Such yarns are referred herein as "Interlaced yarns". Interlacing helps to bind the filaments within the yarns.

"Separable interlaced yarn" as referred herein is a single ply interlaced yarn and that can be split/unplyed from the multi-ply yarns.

"Non-separable yarn" as referred herein is single ply yarn that cannot be split/unplyed from the multi-ply yarns.

"Multi-ply separable interlaced filament yarn" as referred herein is a multi-ply yarn that is separable into at least two separable interlaced filament yarn, wherein the interlacing of the filaments within each separable interlaced filament yarn is retained during further processing of the yarn to fabric and in the fabric.

"Multi-ply separable textured yarn" as referred herein is a multi-ply yarn that is separable in to at least two separable interlaced textured yarn, wherein the interlacing of the filaments within each separable interlaced draw textured yarn is retained during further processing of the yarn to fabric and in the fabric.

Separable interlaced yarns are used amongst other in bed sheets wherein fine and super fine separable interlaced yarns are used to increase the thread count of the fabric.

For manufacturing multi-ply separable draw textured yarn in conventional processes, filament yarn is fed through a feed roller and passed through a heater, cooling plate and a false-twist unit having disks where the twisting and de-twisting, also known as false twisting takes place at a high speed. The yarn is further passed through an intermediate roller or a 'draw roller'. The draw roller draws the yarn while it is heated in the primary heater and getting twisted and de-twisted in the false-twist unit. This gives the yarn the required bulkiness or fluffiness, also referred to as texturizing. The yarn coming out of the draw roller is called as textured yarn. The yarn is then passed through interlacing jets to interlace the filaments within the yarn.

In order to make separable texturized yarns, two or more texturized yarns are wound/plied/grouped together in a single bobbin after passing through an interlacing process. Since the filaments of each yarn are interlaced, each yarn ply gets separated resulting in multi-ply separable textured yarns.

On an industrial scale the textured yarns are produced on a textured machine. In a texture machine there are "X" number of spindles, and "X" number of textured packages are formed at a time if no plying is done. When, plying is done for making multi-ply separable texturized yarns, the number of packages formed at a time is "X" divided by the number of plies. If "n" ply separable textured yarns are made having "d" denier of ply yarns, then the number of textured yarn packages that is made is X/n. This requires "X" number of filament yarn packages and the denier of the wound yarn is d*n However, if one ply breaks, the other remaining ply or plies are also required have to be broken. which makes the industrial process inefficient.

The US20110133011 A1 document titled "Multiend package of multifilament polyester bicomponent yarn" discloses multiend packages of multicomponent yarns, where the yarn is separable into individual ends upon unwinding. The multicomponent yarn may be a bicomponent yarn, such as a yarn including compositionally different polyesters in a side-by-side or eccentric sheath-core configuration. The document further discloses a process for producing a multiend package, wherein the process comprises melt-spinning two or more compositionally different polyesters from a single pre-coalescent or post-coalescent spinneret to form multiple side-by-side or eccentric sheath-core polyester bicomponent filaments.

Thus, the conventional system and/or method of manufacturing multi-ply separable textured yarn has inherent issues such as low productivity, high production cost per kilogram of yarn of a particular denier, and poor capability produce low/fine and ultra-low/fine denier yarns. The system/method of manufacturing multi-ply separable textured yarn, in accordance with the present invention, aims to resolve issues of low production and low productivity associated with the conventional separable multi-ply yarn manufacturing.

Furthermore, conventionally, woven textile fabrics are made from plastics, widely from superfine filament yarns of virgin polymer. It is known that such polymers originating from crude oil sources are significantly not ecofriendly. And, there is no denying in the fact that there is a growing environmental problem associated with the use of such plastics as the plastics cannot be disposed easily.

Additionally, with growing consciousness of saving environment, there is also a need of reuse such plastic as a substitute for virgin plastics in order to overcome one or more of the aforementioned problems in the process as mentioned above.

SUMMARY

This summary is provided to introduce concepts related to recycled separable multi-filament parallel yarns and woven textile fabrics thereof. This summary is neither intended to identify essential features of the present invention nor is it intended for use in determining or limiting the scope of the present invention.

In an embodiment of the present invention, a method of manufacturing a recycled separable interlaced filament yarn is provided. The method includes the steps of melting recycled polymers and passing the polymer melt through a spinning unit to form a plurality of molten streams, and cooling the molten streams in a quenching zone to form plurality of polymer filaments; wherein said polymer filaments are not side-by-side or sheath-core bi-component filament. Further, the method includes grouping the filaments to form a yarn of recycled polymers; and passing the yarn of recycled polymers through at least one interlacing means for strong interlacing the filaments within the yarn by setting the parameters for strong interlacing to provide a separable interlaced filament yarn. Wherein the interlacing of the filaments within the yarn is significantly retained during further processing of the yarn to fabric and in the fabric so that yarn Ply of said Separable Interlaced filament yarn is separable from other yarn plies in the fabric. And, wherein parameters for strong interlacing are number of interlacing devices, number of filaments in the yarn, type of the filament, denier of the yarn, speed of the yarn passing through the interlacing devices, number of jets in the interlacing devices, number of nozzles in said jet, diameter of nozzles, type of fluid passed through the nozzles of the jets for causing interlacing of filaments and pressure of the fluid.

In another embodiment of the present invention, a separable interlaced filament yarn is converged with at least one more separable interlaced filament yarn to provide a multi-ply separable interlaced filament yarn, wherein filament yarn is formed from recycled polymers.

In another embodiment of the present invention, a method for manufacturing a multi-ply separable textured yarn formed from recycled polymers is provided. The method includes passing a multi-ply separable interlaced filament yarn through a texturizing unit to form a multi-ply separable draw textured yarn, wherein the multi-ply separable interlaced filament yarn is formed from recycled polymers. Further, the filament yarn is separable into at least two separable interlaced filament yarn, and wherein the interlacing of the filaments within each separable interlaced filament yarn is retained during further processing of the yarn to fabric and in the fabric thereof.

In another embodiment of the present invention, the multi-ply separable interlaced filament yarn is formed by converging at least two separable interlaced filament yarns, wherein filament yarn is formed from recycled polymers.

In another embodiment of the present invention, the multi-ply separable interlaced filament yarn is formed by converging at least one separable interlaced filament yarn with one at least one multi-ply separable interlaced filament yarn, wherein filament yarn is formed from recycled polymers.

In another embodiment of the present invention, the multi-ply separable interlaced filament yarn is formed by converging at least two multi-ply separable interlaced filament yarns, wherein filament yarn is formed from recycled polymers.

In another embodiment of the present invention, a group of recycled separable multi-filament parallel yarns is provided. The group consists of at least two recycled separable multi-filament parallel yarns, wherein the denier of the yarn ranges from 5 to 30. Further, the filaments of the yarn are intermingled and the nips per meter of the yarn is in range of 15 to 150. Furthermore, the filaments of the yarns are in the range of 5 to 35 and the recycled separable multi-filament parallel yarns are made of in such a manner that they are separable and distinguishable from other yarns very clearly.

In another embodiment of the present invention, the recycled separable multifilament parallel yarns are selected from the group consisting of partially oriented yarn (POY), medium oriented yarn (MOY), fully oriented yarn (FOY), and draw textured yarns (DTY).

In another embodiment of the present invention, the yarns consist of material selected from the group consisting of recycled polyester, recycled polyamide, recycled polypropylene and recycled polylactic acid.

In another embodiment of the present invention, a high thread/yarn count woven textile fabric is provided. The high thread/yarn count woven textile fabric includes a plurality of warps, and a plurality of wefts. The high thread/yarn count woven textile fabric may be having 250 to 3000 picks per inch in the weft. In another exemplary embodiment the high thread/yarn count woven textile fabric may include up to 6000 picks per inch in the weft. Further, the at least two recycled separable multi-filament parallel yarn picks are woven in groups together in the weft. Furthermore, the recycled separable multi-filament parallel picks are separable from other picks, and the denier of the recycled separable multi-filament yarn may be in the range of 5 to 50. Therefore, the thread/yarn count of the fabric can be in the range of between 400 to 3000, which can go up to 6000.

In another embodiment of the present invention, the recycled separable multifilament parallel picks consist of material selected from the group consisting of recycled polyester, recycled polyamide, recycled polypropylene and recycled polylactic acid.

In another embodiment of the present invention, the recycled separable multifilament parallel picks are selected from the group consisting of partially oriented yarn (POY), medium oriented yarn (MOY), fully oriented yarn (FOY), and draw textured yarns (DTY)

In yet another embodiment of the present invention, a bedding includes the high thread/yarn count woven textile fabric.

BRIEF DESCRIPTION OF THE ACCOMPANYING DRAWING

Characteristics and advantages of the subject matter as disclosed in the present invention will become clearer from the detailed description of an embodiment thereof, with reference to the attached drawing, given purely by way of an example. in which:

FIGS. 7A, 7B and 7C, illustrates a table in three parts (Table 1/3, 2/3, 3/3) which depicts a significant gain in Output and Capability by using the system and method of manufacturing in accordance with the present invention compared to the conventional way.

Figure 1:
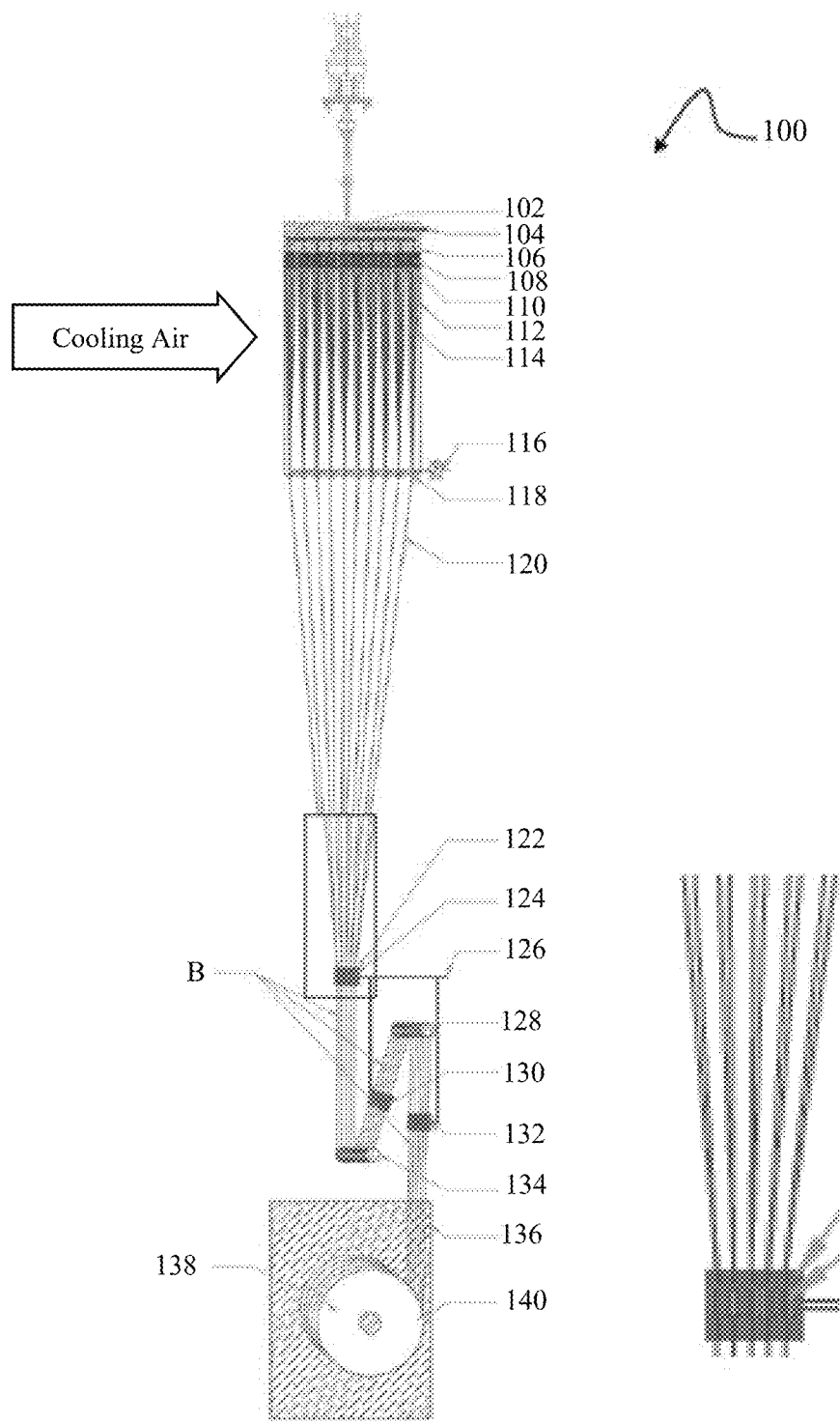
FIGS. 1 and 2 illustrate examples of conventional filament yarn manufacturing.

The present invention will now be described with reference to the following non-limiting embodiments.

DETAILED DESCRIPTION

The invention will now be described with reference to the accompanying embodiments which do not limit the scope and ambit of the invention. The description provided is purely by way of example and illustration.

In an embodiment of the present invention, a method of manufacturing a recycled separable interlaced filament yarn is provided. The method includes the steps of melting recycled polymers and passing the polymer melt through a spinning unit to form a plurality of molten streams, and cooling the molten streams in a quenching zone to form plurality of polymer filaments; wherein said polymer filaments are not side-by-side or sheath-core bi-component filament. Further, the method includes grouping the filaments to form a yarn of recycled polymers; and passing the yarn of recycled polymers through at least one interlacing means for strong interlacing the filaments within the yarn by setting the parameters for strong interlacing to provide a separable interlaced filament yarn. Wherein the interlacing of the filaments within the yarn is significantly retained during further processing of the yarn to fabric and in the fabric so that yarn Ply of said Separable Interlaced filament yarn is separable from other yarn plies in the fabric. And, wherein parameters for strong interlacing are number of interlacing devices, number of filaments in the yarn, type of the filament, denier of the yarn, speed of the yarn passing through the interlacing devices, number of jets in the interlacing devices, number of nozzles in said jet, diameter of nozzles, type of fluid passed through the nozzles of the jets for causing interlacing of filaments and pressure of the fluid.

In an embodiment of the present invention, a separable interlaced filament yarn is converged with at least one more separable interlaced filament yarn to provide a multi-ply separable interlaced filament yarn, wherein filament yarn is formed from recycled polymers.

In an embodiment of the present invention, the recycled separable interlaced filament yarn is converged with at least one more recycled separable interlaced filament yarn to provide a multi-ply recycled separable interlaced filament yarn.

In an embodiment of the present invention, the present invention discloses a method for manufacturing a recycled multi-ply separable draw textured yarn (DTY), the method comprising the step of passing at least one multi-ply separable interlaced filament yarns through a texturizing unit/spindle, wherein the multi-ply separable interlaced filament yarn is formed from recycled polymers, wherein the recycled filament yarn is separable into at least two recycled separable interlaced filament yarn; wherein the interlacing of the filaments within each recycled separable interlaced filament yarn is retained during further processing of the yarn to fabric and in the fabric so that yarn ply of said recycled separable interlaced filament yarn is separable from other yarn plies in the fabric or passing two or more separable interlaced filament yarns, wherein filament yarns are formed from recycled polymers through a texturizing unit/spindle, wherein the interlacing of the filaments within said recycled yarn is retained during further processing of the yarn to fabric, and in the fabric so that ply of said recycled separable interlaced filament yarn is separable from other yarn plies in the fabric; or passing a combination of one or more multi-ply separable interlaced filament yarn and single ply separable interlaced filament yarns through a texturizing unit/spindle, wherein filament yarns are formed from recycled polymers, wherein the recycled multi-ply separable interlaced filament yarn is separable into at least two recycled separable interlaced filament yarns, wherein the interlacing of the filaments within said recycled yarn is retained during further processing of the yarn to fabric, and in the fabric so that ply of said recycled separable interlaced filament yarn is separable from other yarn plies in the fabric; to form recycled multi-ply (multiple yarns) separable draw textured yarn, wherein the recycled multi-ply separable draw texturized yarn is separable in to at least two separable draw texturized yarns and wherein the interlacing of the filaments within said recycled separable draw texturized yarn is retained during further processing of the yarn to fabric, and in the fabric so that ply of said recycled separable draw textured yarn is separable from other yarn plies in the fabric.

In an embodiment of the present invention, at least one recycled multi-ply separable draw textured yarn (DTY) is converged with at least one recycled multi-ply separable draw textured yarn (DTY) to increase the number of plies.

In an embodiment of the present invention, a group of recycled separable multi-filament parallel yarns is provided. The group consists of at least two recycled separable multi-filament parallel yarns, wherein the denier of the yarn ranges from 5 to 30. Further, the filaments of the yarn are intermingled and the nips per meter of the yarn is in range of 15 to 150. Furthermore, the filaments of the yarns are in the range of 5 to 35 and the recycled separable multi-filament parallel yarns are made of in such a manner that they are separable and distinguishable from other yarns very clearly.

In another embodiment of the present invention, the recycled separable multifilament parallel yarns are selected from the group consisting of partially oriented yarn (POY), medium oriented yarn (MOY), fully oriented yarn (FOY), and draw textured yarns (DTY).

In an embodiment of the present invention, the yarns consist of material selected from the group consisting of recycled polyester, recycled polyamide, recycled polypropylene and recycled polylactic acid.

In an embodiment of the present invention, a high thread/yarn count woven textile fabric is provided. The high thread/yarn count woven textile fabric includes a plurality of warps, and a plurality of wefts. The high thread/yarn count woven textile fabric may be having 250 to 3000 picks per inch in the weft. In another exemplary embodiment the high thread/yarn count woven textile fabric may include up to 6000 picks per inch in the weft. Further, the at least two recycled separable multi-filament parallel yarn picks are woven in groups together in the weft. Furthermore, the recycled separable multi-filament parallel picks are separable from other picks, and the denier of the recycled separable multi-filament yarn may be in the range of 5 to 50. Therefore, the thread/yarn count of the fabric can be in the range of between 400 to 3000, which can go up to 6000.

In an embodiment of the present invention, the recycled separable multifilament parallel picks consist of material selected from the group consisting of recycled polyester, recycled polyamide, recycled polypropylene and recycled polylactic acid.

In another embodiment of the present invention, the recycled separable multifilament parallel picks are selected from the group consisting of partially oriented yarn (POY), medium oriented yarn (MOY), fully oriented yarn (FOY), and draw textured yarns (DTY)

In an embodiment of the present invention, a bedding includes the high thread/yarn count woven textile fabric.

Figure 2:
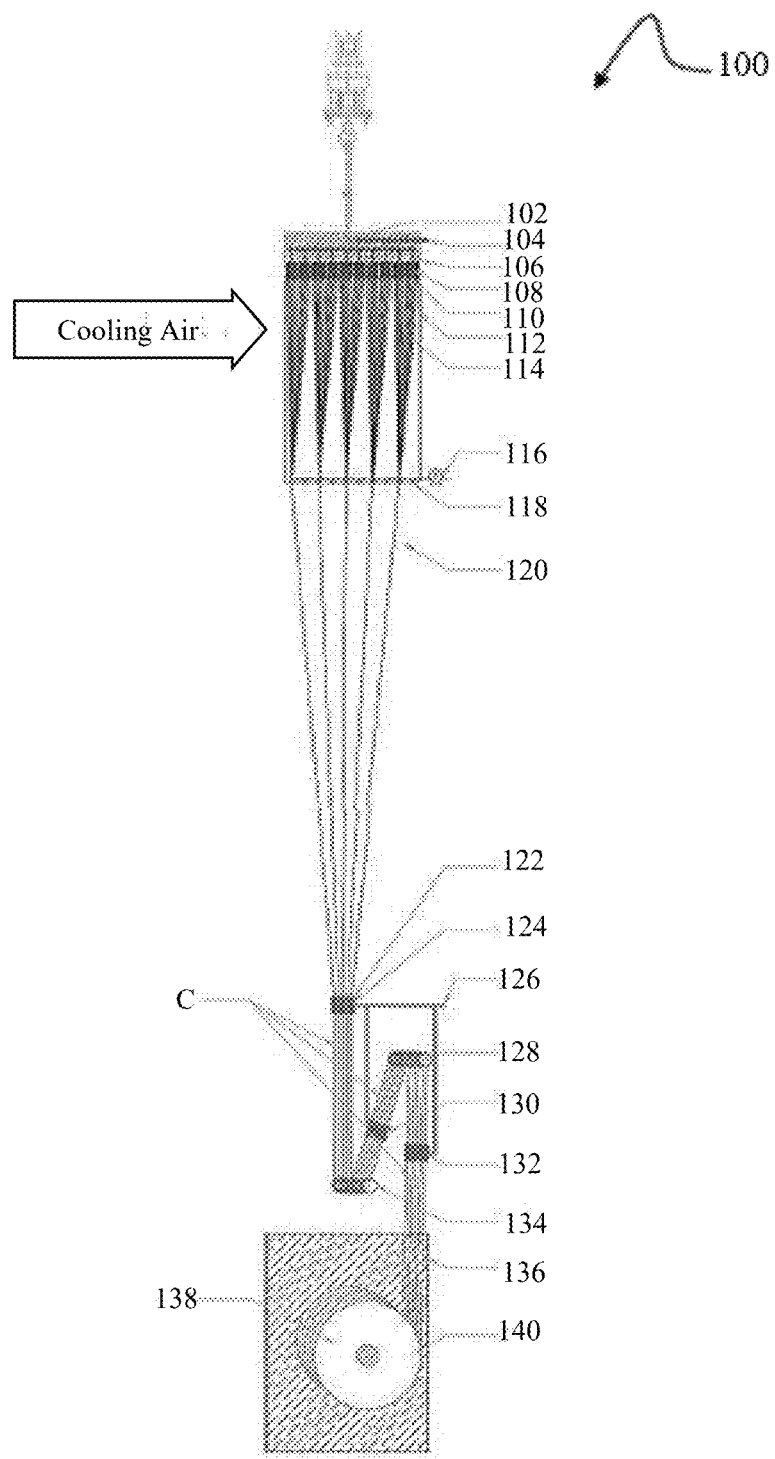

FIGS. 1, 2 illustrate conventional method of manufacturing filament yarn, wherein polymer melt is received in a spinning unit (100) via an inlet line (104) and is pressurized or extruded with a melt pump (102) through nozzles (two or more in numbers) in spinnerets (110) placed in a spin pack (108). This results in the generation of two or more polymer filaments (114). These filaments (114) are cooled in a quenching chamber (112) with air in order to solidify. The solidified filaments (114) are bunched in groups of two or more to make a yarn (120).

As shown in the embodiment illustrated in FIG. 1, ten filaments (114) are grouped to make one filament yarn (120). In this way, ten yarns (120) are formed. In this embodiment, there is one spin pack (108) and hence one spinneret (110) for making one filament yarn (120). The filament yarns (120) are passed through spin finish oil applicator (118), spin finish oil is applied on the yarns (120) using a spin finish pump and a spin finish application nozzles to give it oiling/greasing. Spin finish may also be applied using a roller dipped in spin finish oil.

The polymer filaments used in accordance to the present invention are not side-by-side or sheath-core bi-component filament.

Yarns may also be plied. i.e., multiple yarns wound or grouped together on a single bobbin to increase the denier of each yarn, or increase the filaments per yarn or improve the quality of the yarn. In this embodiment two filament yarns (120) are plied together to form a 2-ply filament yarn. In this way, five 2-ply filament yarns are formed.

The plied yarns are passed through one or more enclosure/device referred to as interlacing/migration/interlacing/comingling/fluid jets/nozzles (124), (130), and (132) ("Interlacing Jet"). In the interlacing jet the filaments of the yarn are subjected to a pressured fluid passed through one or more nozzles from fluid inlet pipe (126), to achieve one or more of the objects namely: interlacing of filaments with each other; comingling of filaments with each other; equal distribution of spin finish oil across the yarn; knotting of filaments in a yarn; and binding of filaments in a yarn.

Conventionally, interlacing is carried out at fluid pressure of 1 to 3 bar for filament yarns. Interlacing results in better processing speeds in filament yarn manufacturing, improves bobbin package build, even distribution of spin finish, reduces filaments and yarn breaks.

In FIG. 1, the interlaced yarns are represented by B. In different embodiments, the number of interlacing jets per yarn may vary in the entire yarn path (nil to many). In FIG. 1 such varying sets of interlacing jets are shown.

When the plied yarns are passed through the interlacing Jet (124, 130, 132) having sufficient fluid pressure, the filaments of the yarn plies intermingle/bind and become a singular yarn, the plies of which are non-separable. In FIG. 1, non-separable filament yarns are formed as the yarns are plied before interlacing.

The interlaced yarns are passed through separator rollers (also referred to as godets). Preferably, two such separator rollers (128), (134) are provided for good quality of filament yarn. The number of separator rollers, however, may vary depending upon the requirement. The separator rollers help achieve the objectives amongst others by providing stability to yarns and assist drawing or underfeeding or over feeding the yarns, and adjustment of yarn tension.

Finally, the interlaced yarns are sent to a winder (136) provided with one or more bobbins (also referred to as tubes or cones) (140). Each interlaced yarn is wound around a discrete bobbin. The winder may have a capacity to wind yarn on 10 bobbins at a time. Reference numeral (138) denotes the number of bobbins (140) of yarn wounded in each case.

FIG. 2 illustrate manufacturing of the filament yarns without plying to form filament yarn. In this embodiment, five filament yarns are formed. In this embodiment, the filaments of yarn are subjected to pressurized fluid between 1 to 3 bar in the interlacing jets, resulting in interlaced yarns and are wound directly. In this embodiment, 5 single interlaced filament yarns are wound onto 5 bobbins.

Figure 3A:
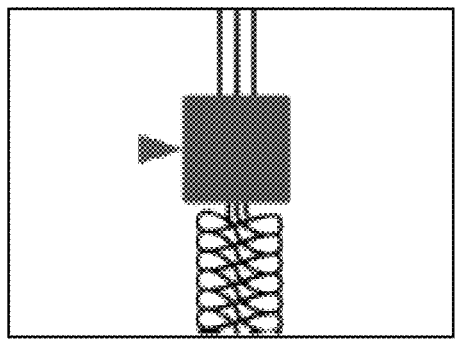
FIGS. 3A, 3B and 3C illustrate various types of interlacing of yarns.
Figure 3B:
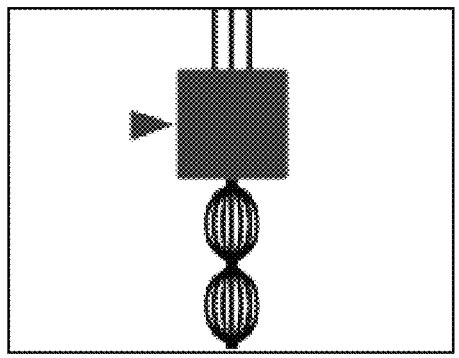
Figure 3C:
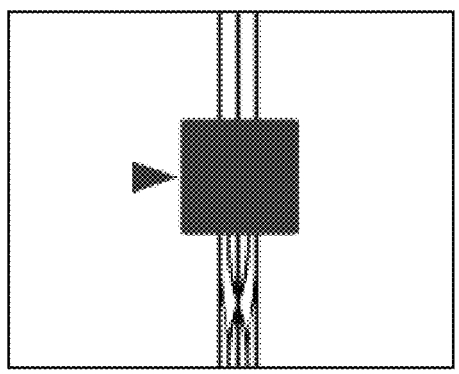

FIGS. 3A, 3B, and 3C illustrate effects of intermingling or interlacing of filaments of a yarn, when the yarn is passed through the interlacing jet having pressured fluid jet. The filament yarn disclosed in the present invention is formed from recycled polymers. In said Figures, an arrow head represents the flow of pressurized fluid through a nozzle or Interlacing Jet (124), (130), (132), shown as a block. This results in knotting or intermingling or interlacing or comingling or bonding of the filaments of yarn. The intensity or strength of interlacing can be varied with amongst others, the changing of fluid pressure, nozzle diameter and the number of nozzles, nozzle angle, etc.

On an industrial scale, a filament yarn manufacturing system has plurality of winders 136. Production of a filament yarn line is given by the following formula at 100% efficiency:

Production per day in Kgs per Line=Number of winders*Number of bobbins wound at a time*Denier of wound yarn*Speed (meters per minute–mpm)*60 (min)*24 (hours)/9000000.

It has been found that the multi-ply filaments yarns produced in accordance with the prior art are not separable into individual yarns after further process like texturizing and in fabric after processing when unplyed or ungrouped.

Figure 4:
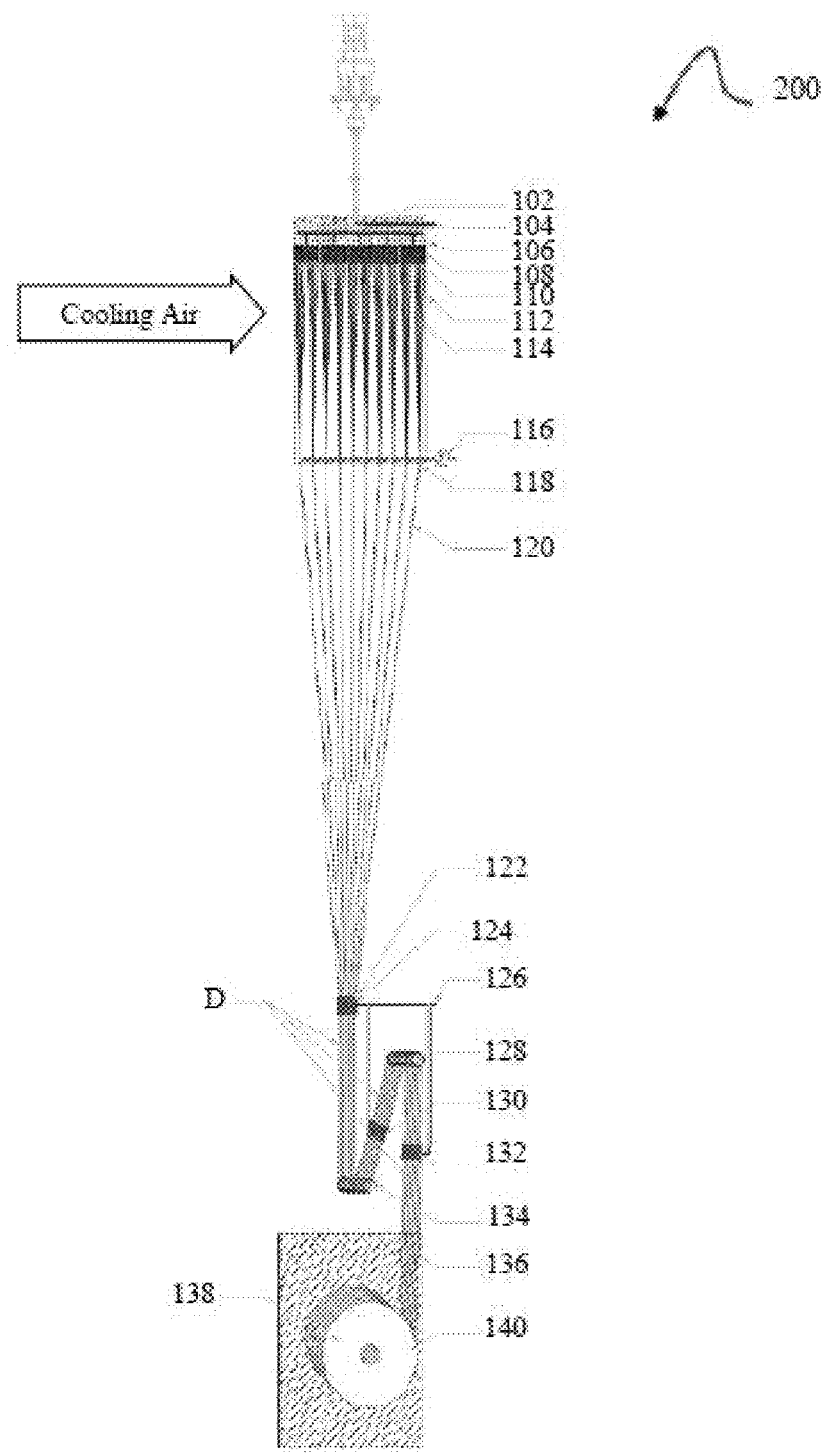
FIG. 4 illustrate example of manufacturing separable interlaced filament yarn using a system and method in accordance with the present invention.

FIG. 4 illustrate the manufacturing method of separable interlaced filament yarn using method in accordance with the present invention.

As illustrated in FIG. 4, the polymer melt produced by melting recycled polymers is received in a spinning unit (100) via an inlet line (104) and is pressurized or extruded with a melt pump (102) through nozzles (two or more in numbers) in spinnerets (110) placed in a spin pack (108). This results in the generation of two or more polymer filaments (114). These filaments (114) are cooled in a quenching chamber (112) with air in order to solidify. The solidified filaments (114) are bunched in groups of two or more to make a yarn (120). Ten filaments (114) are grouped to make one filament yarn (120). In this way, ten yarns (120) are formed. The filament yarns (120) are passed through spin finish oil applicator (118), spin finish oil is applied on the yarns (120) using a spin finish pump. The yarns are then passed through one or more enclosure/device referred to as interlacing/migration/interlacing/comingling/fluid jets/nozzles (124), (130), and (132) ("Interlacing Jet"). In the interlacing jet the filaments of yarn are subjected to a pressured fluid passed through one or more nozzles from fluid inlet pipe (126), to achieve one or more of the objects namely interlacing of filaments with each other; comingling of filaments with each other; equal distribution of spin finish oil across the yarn; knotting of filaments in a yarn, and binding of filaments in a yarn.

Interlacing results in better processing speeds in further processing, improves bobbin package build, even distribution of spin finish, reduces filaments and yarn breaks. Separable interlaced filament yarn is formed by interlacing in such a way that the interlacing remains in further processing of yarn and in the fabric. In this figure, separable interlaced filament yarns are represented by D. In different embodiments, the number of interlacing jets per yarn may vary in the entire yarn path.

The interlaced yarns may be passed through separator rollers (also referred to as godets). Preferably, two such separator rollers (128), (134) are provided for good quality of filament yarn. The number of separator rollers, however, may vary depending upon the requirement. The separator rollers help achieve the objectives amongst others namely: providing stability to yarns and assist drawing or underfeeding or over feeding the yarns and adjustment of yarn tension.

Finally, the yarns are sent to a winder (136) provided with one or more bobbins (also referred to as tubes or cones) (140). Each yarn is wound around a discrete bobbin. The winder has a capacity to wind yarn on 10 bobbins at a time. Reference numeral (138) denotes the number of bobbins (140) of yarn wounded in each case.

In one embodiment of the present invention, the separable interlaced filament yarn is converged with at least one more separable interlaced filament yarn to provide a multi-ply separable interlaced filament yarn, wherein filament yarn is formed from recycled polymers.

Figure 4A:
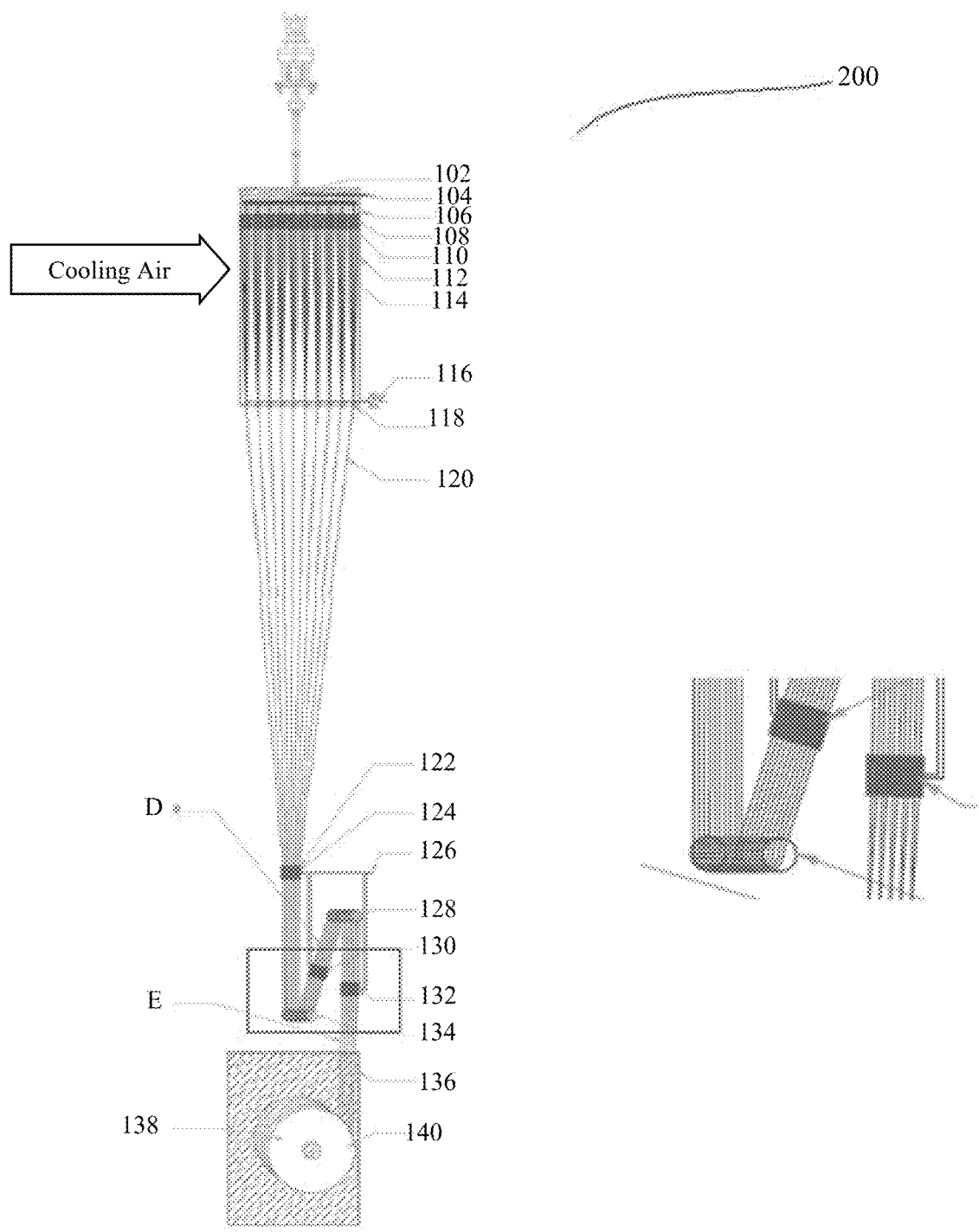
FIGS. 4A, 4B, 4C, 5A, 5B and 5C illustrate various examples of manufacturing multi-ply separable interlaced filament yarn in a productive manner using a system and method in accordance with the present invention.
Figure 4B:
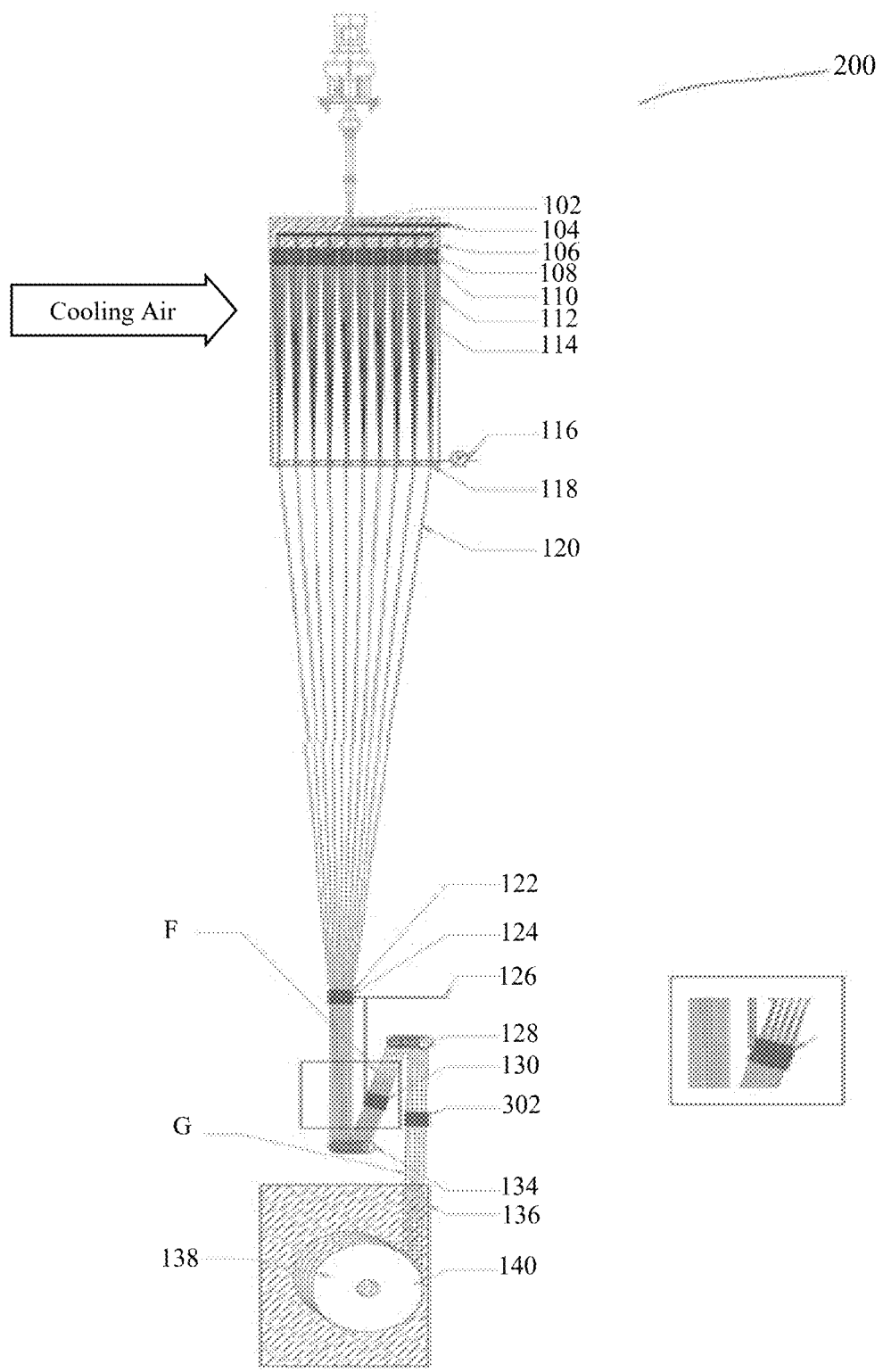
Figure 4C:
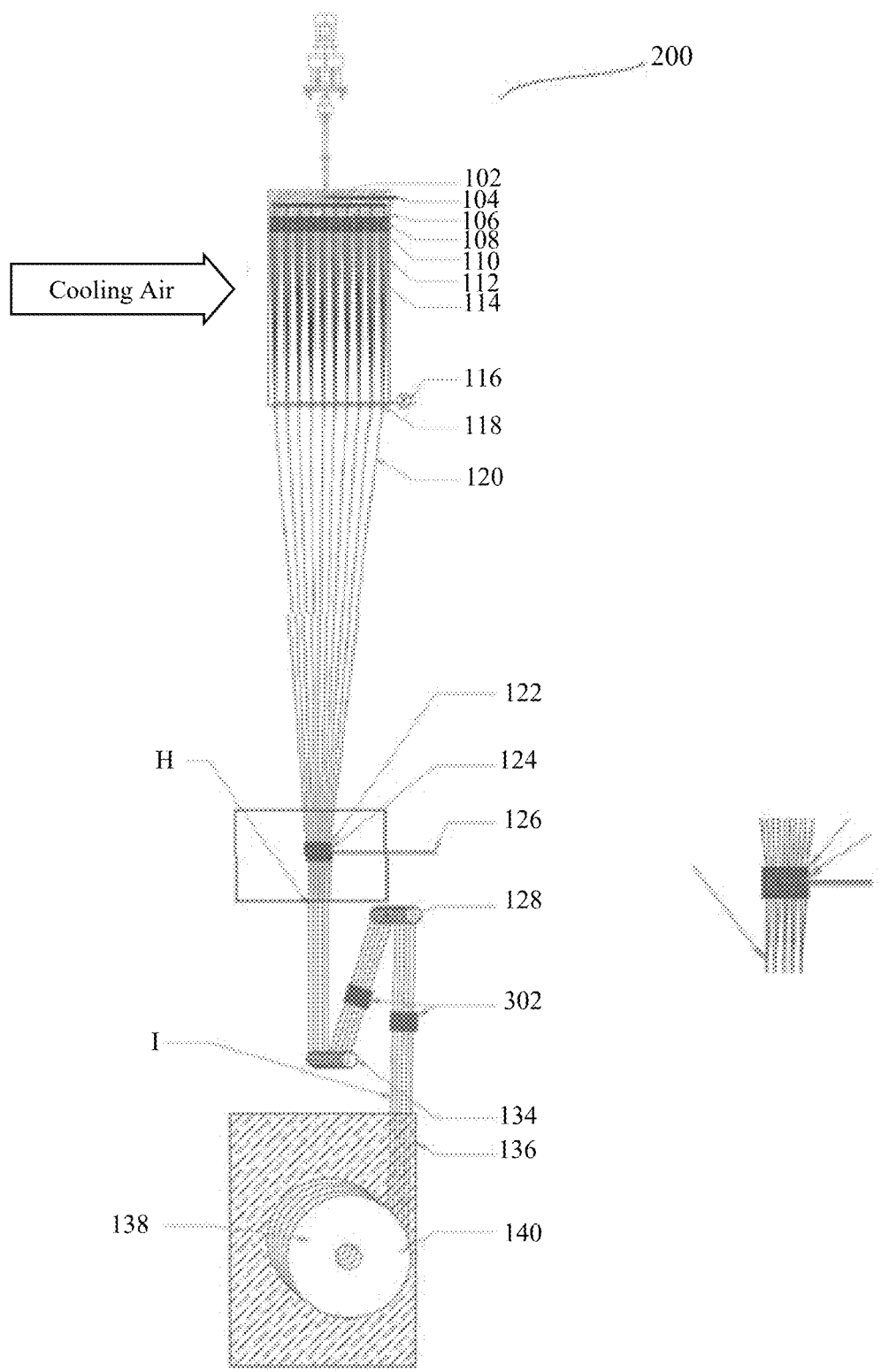

FIGS. 4A, 4B and 4C illustrate various examples of manufacturing multi-ply separable interlaced filament yarn using a system and method in accordance with the present invention. In relation to the set of FIGS. 4A, 4B and 4C, the structural features of the spinning unit (200), common to the spinning unit (200), are obviated for the sake of brevity. The plying of the filament yarn as illustrated in FIGS. 4A, 4B and 4C is done after passing them through at least one interlacing jet (124, 130, and 132) where the combination of fluid pressure, nozzle size, number of nozzles are used in a way that very strong interlacing (bonding/intermingling/comingling/entangling) between the filaments of a yarn ply takes place. The filament yarns are formed from recycled polymers. The process of interlacing ensures that filaments do not open during further processing on a texturizing machine and in fabric resulting in separable interlaced filament yarn.

Following are the examples of interlacing done for different denier of Polymers in accordance with the present invention the interlacing of which is significantly retained after Texturizing Process and also in the finished fabric:

| Filament yarn diner | Filaments Nos | Filament yarn type | Process speed MPM | Jet nozzle dia mm | Jet fluid pressure Bar g | Jet nozzle Nos | Fluid | Separable filament yarn | Filament yarn avg elongation % |
|---|---|---|---|---|---|---|---|---|---|
| 32 | 14 | Polyester POY | 3000 | 1.2 | 5.0 | 1 | Air | Yes | 135 |

-continued

| Filament yarn diner | Filaments Nos | Filament yarn type | Process speed MPM | Jet nozzle dia mm | Jet fluid pressure Bar g | Jet nozzle Nos | Fluid | Separable filament yarn | Filament yarn avg elongation % |
|---|---|---|---|---|---|---|---|---|---|
| 32 | 14 | Polyester POY | 3000 | 1.4 | 4.2 | 1 | Air | Yes | 136 |
| 32 | 14 | Polyester POY | 3000 | 1.6 | 4.0 | 1 | Air | Yes | 133 |
| 32 | 24 | Polyester POY | 3000 | 1.2 | 3.5 | 1 | Air | Yes | 128 |
| 32 | 24 | Polyester POY | 3000 | 1.4 | 3.0 | 1 | Air | Yes | 128 |
| 25 | 14 | Polyester POY | 2900 | 1.2 | 4.8 | 1 | Air | Yes | 130 |
| 25 | 14 | Polyester POY | 3000 | 1.4 | 4.2 | 1 | Air | Yes | 129 |
| 25 | 14 | Polyester POY | 3000 | 1.6 | 3.8 | 1 | Air | Yes | 129 |
| 25 | 10 | Polyester POY | 3000 | 1.2 | 5.5 | 1 | Air | Yes | 132 |
| 25 | 10 | Polyester POY | 3000 | 1.4 | 5.0 | 1 | Air | Yes | 132 |
| 16 | 14 | Polyester POY | 3000 | 1.2 | 4.5 | 1 | Air | Yes | 125 |
| 16 | 14 | Polyester POY | 3000 | 1.4 | 4.0 | 1 | Air | Yes | 124 |
| 16 | 14 | Polyester POY | 3000 | 1.6 | 3.7 | 1 | Air | Yes | 124 |
| 16 | 7 | Polyester POY | 3000 | 1.2 | 5.0 | 1 | Air | Yes | 130 |
| 5 | 5 | Polyester POY | 3000 | 1.4 | 3 | 1 | Air | Yes | 129 |
| 16 | 7 | Polyester POY | 3000 | 1.4 | 4.3 | 1 | Air | Yes | 129 |
| 22 | 14 | Polyamide 6 POY | 3750 | 1.2 | 6.0 | 1 | Air | Yes | 55 |
| 22 | 14 | Polyamide 6 POY | 3750 | 1.4 | 5.5 | 1 | Air | Yes | 54 |
| 16 | 12 | Polyamide 6 POY | 3650 | 0.9 | 6.6 | 1 | Air | Yes | 50 |
| 16 | 12 | Polyamide 6 POY | 3650 | 1.2 | 6.5 | 1 | Air | Yes | 51 |
| 16 | 07 | Polyamide 6 POY | 3700 | 1.2 | 7.0 | 1 | Air | Yes | 55 |
| 16 | 07 | Polyamide 6 POY | 3700 | 1.2 | 1.8 | 1 | Air | No | 55 |

The above are only examples and the parameters may vary depending on spinning machine, filament yarn type, process speeds, nozzle dia, nozzle angle, fluid used, number of nozzles and various other factors.

In FIGS. 4A, 4B, and 4C, multi-ply separable interlaced filament yarn at various stages are represented by E, G, and I.

In FIG. 4A, there is grouping of two separable interlaced filament yarn represented by "D" between the separator roller (134) and the winder (136), after the interlacing jet (132) to form a 2-ply separable interlaced yarn as represented by "E".

In FIG. 4B, there is a grouping of two separable interlaced filament yarns represented by "F" between two separator roller (128) and (134), after the interlacing jet (130) to form a 2-ply separable interlaced yarn as represented by "G".

In FIG. 4C, there is a grouping of two separable interlaced filament yarns represented by "H" between the quenching chamber (112) and the separator roller (134), after the interlacing jet (124) to form a 2-ply separable interlaced yarn as represented by "I".

In FIGS. 4B and 4C, the migration block (302) is either treated as a 'bypass' block having no or very little fluid pressure. The interlacing jets (124. 130, and 132) can be placed at any location in the entire yarn path between the spinnerets (110) and the winder (136), for example, as shown in FIG. 4A.

In an embodiment, fluid pressure in the interlacing jets (124, 130, 132) may also be increased/decreased and/or a nozzle diameter of the interlacing jet (124, 130, 132) may be increased/decreased to achieve more strong and effective interlacing of the filaments before plying. Due to this, the filaments of one yarn ply do not mix with the filaments of another yarn ply during processing, and results in a multi-ply, separable filament yarn. In each of the cases shown in FIGS. 4A, 4B and 4C, five packages of 2-ply/separable interlaced filament yarns are formed.

With this process, the output of a particular line producing a particular denier of a ply can be increased manifolds by just increasing the number of interlacing jets in the yarn path. The number of spin finish application nozzles (118) may be increased as necessary. The capital investment of doing this is very low compared to the conventional filament yarn manufacturing process. Further, the increased output also results in reduced production cost per kg of yarn of a particular denier. In fact, the more the number of plies of yarns of a particular denier, more the capacity in a single line.

Figure 5A:
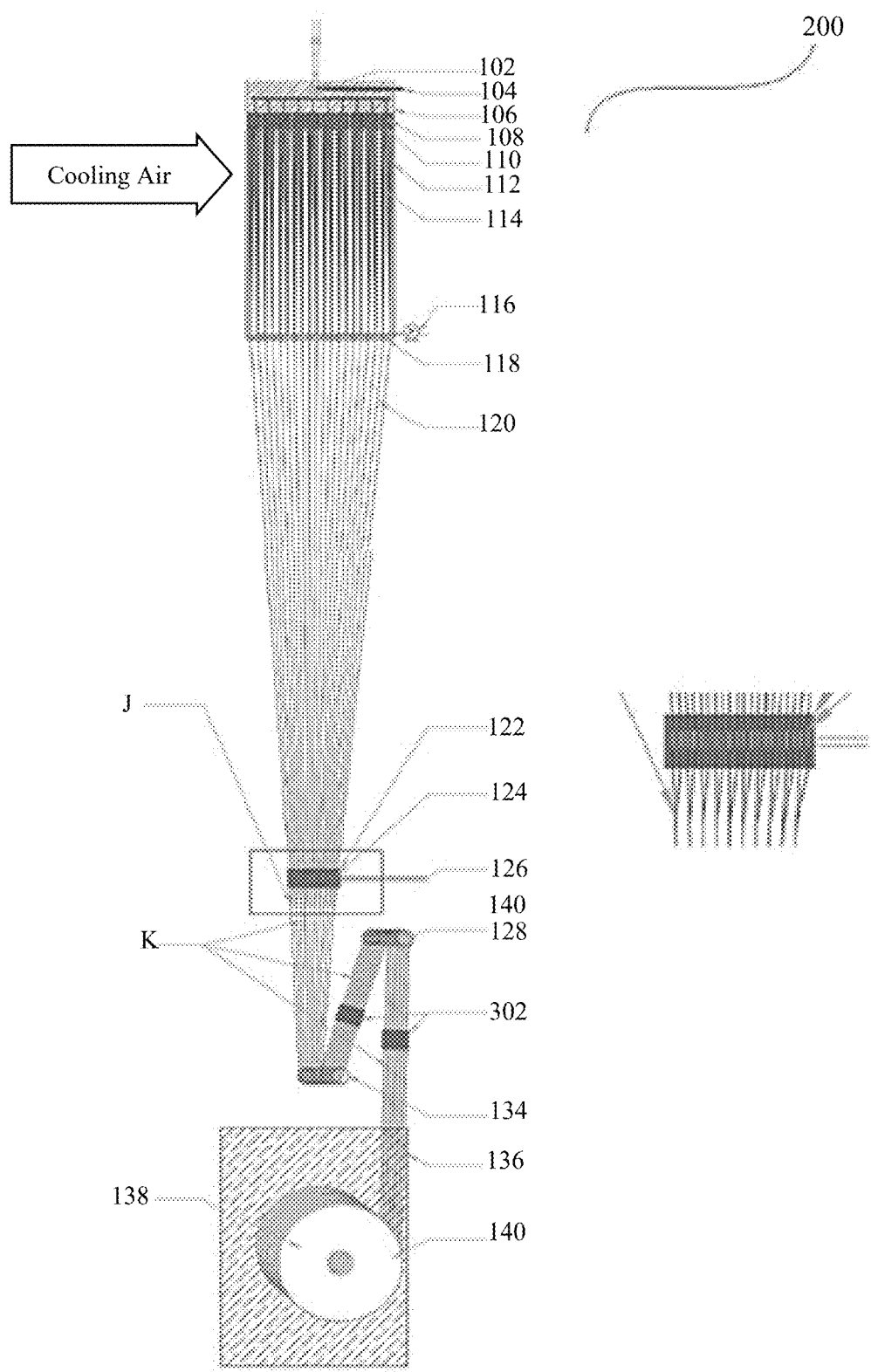
Figure 5B:
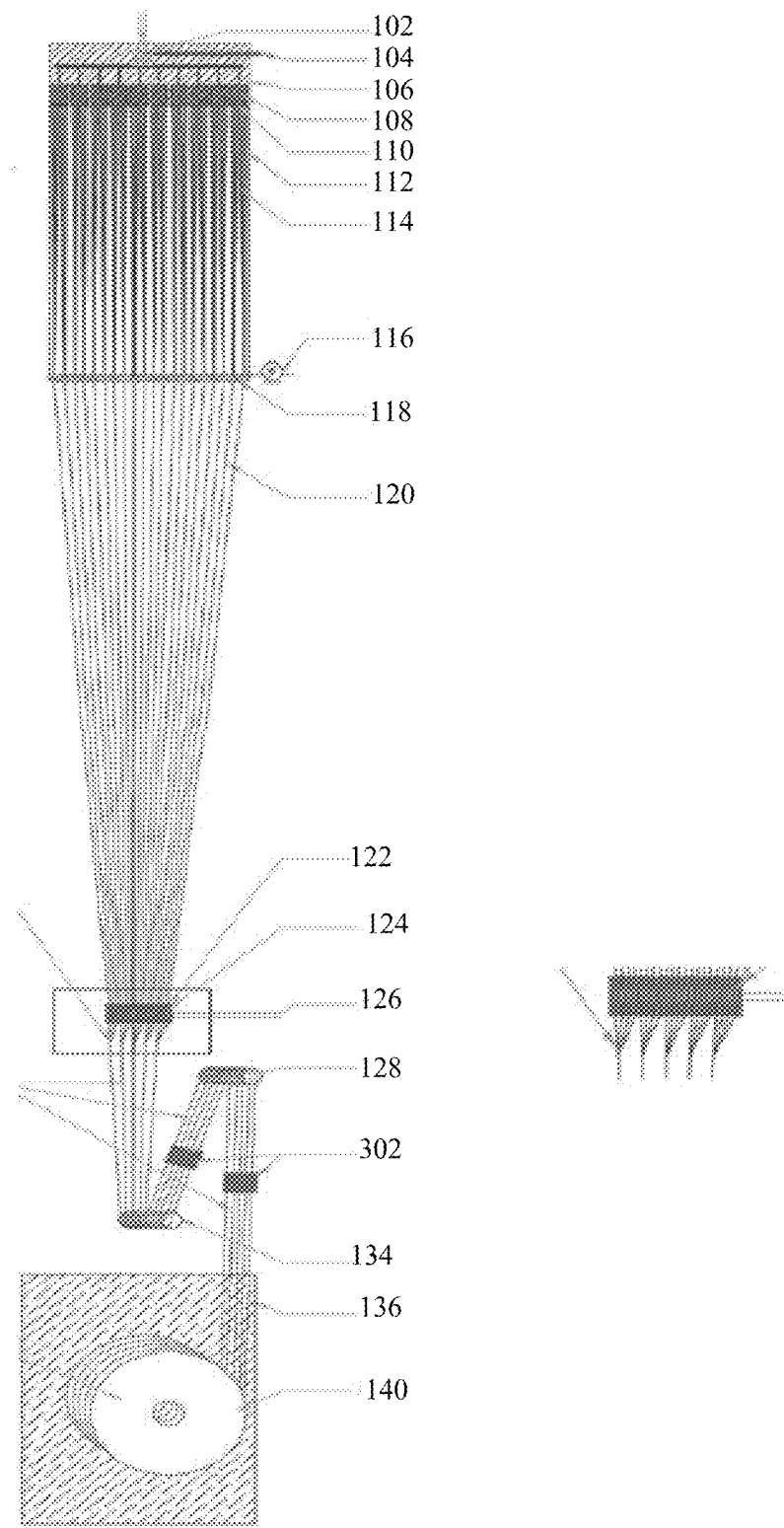

As shown in FIGS. 5A and 5B, the output of a particular denier (before plying) at a particular speed is doubled as compared to system shown in FIGS. 4A, 4B, and 4C by just doubling the number of the interlacing jet (124, 130, 132) and spin finish application nozzles (118).

Figure 5C:
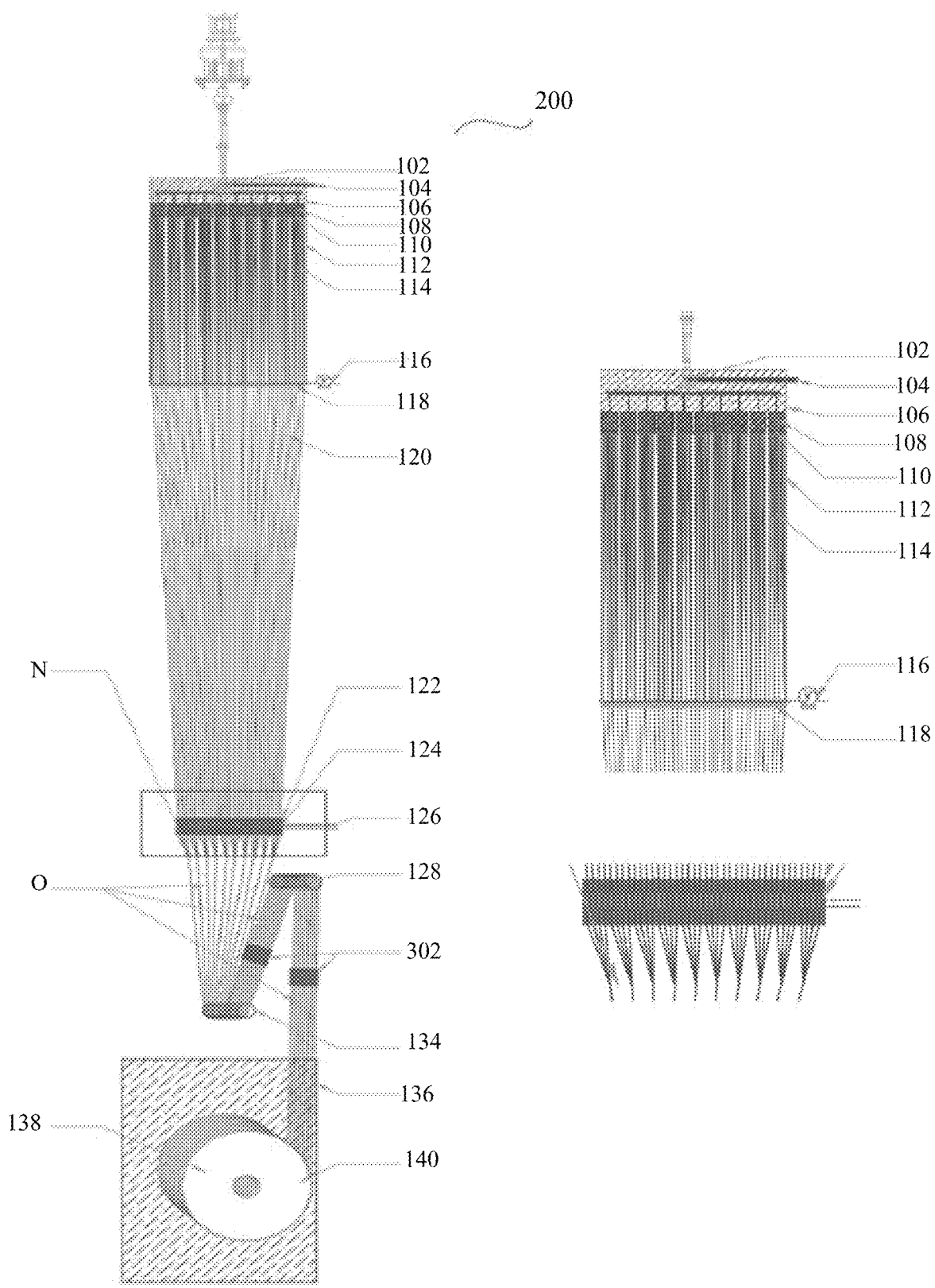

In FIG. 5C, the output is quadrupled as compared to the rest. Thus, in accordance with the process of the present invention, the output can be made triple or five times or 'x' times. In FIGS. 5A, 5B and 5C, separable interlaced filament yarn at various stages are represented by K, M and O.

In FIG. 5A, J represents two separable interlaced filament yarn grouped between the quenching chamber (112) and the separator roller (134), after the interlacing jet (124) to form a 2-ply separable yarn represented by "K".

In FIG. 5B, L represents four separable interlaced filament yarn grouped between the quenching chamber (112) and the separator roller (134), after the interlacing jet (124), to form a 4-ply separable interlaced yarn represented by "M"

In FIG. 5C, N represents four separable interlaced filament yarn grouped between the quenching chamber (112) and the separator roller (134), after the interlacing jet (124), to form a 4-ply separable interlaced represented by "O".

In the embodiments as illustrated in the FIGS. 5A, 5B and 5C, production of ten packages of 2-ply separable interlaced filament yarn, five packages of 4-ply separable interlaced filament yarn, and 10 packages of 4-ply separable interlaced filament yarn are shown, wherein filament yarn is formed from recycled polymers.

Further, by using this method and increasing the output for a multi-ply separable interlaced filament yarn, it would also be possible to make fine and ultra-fine denier yarns up to 3 denier per yarn ply, which is a not possible using conventional technique due to the limitations of a minimum melt pump throughout, high residence time.

In a process for manufacturing multi-ply separable textured yarn using conventional processes (FIG. 6A), a filament yarn package (202) is placed on a filament yarn stand/creel of a texturizing/DTY machine and filament yarn (203) is fed through a primary input roller (206) or feed roller. Through a primary heater (208), the filament yarn is oriented and is passed on a cooling plate (210). The cooled yarn is then passed through a false twist unit (212) having disks in which twisting and de-twisting, also known as false twisting, takes place at high speed. A twist unit is also called as a "texturizing spindle" and the capacity of such a machine depends on the number of spindles it has. The yarn is further passed through an intermediate roller (214) or a 'draw roller'. The draw roller draws the yarn while it is heated in the primary heater and getting twisted and de-twisted in the false-twist unit. This gives the yarn the required bulkiness or fluffiness, also referred to as "texturize". The yarn coming out of the draw roller is called as DTY or textured yarn (222).

The interlacing (if any) in filament yarn in the conventional method gets majorly opened during the texturing process, as it is very weak. Interlacing of the filament yarn barely remains and not seen in the texturing process. High interlacing is then done on the Texturizing Machine with interlacing/intermingling jets (215) for getting the filaments of yarn interlaced/intermingled/knotted. The yarn is further optionally passed through a secondary heater (216) where the properties of the yarn, such as shrinkage, bulkiness, twist, dyeing, and affinity, are stabilized with the help of an output roller (218). Further, oil is optionally applied through an oiling roller (220) or an oil application nozzle which acts like a grease for the yarn enabling good performance in end uses of yarn. Finally, two or more yarns (222) are grouped/plied to form multi-ply separable textured yarns (239) and wound onto a tube to create a multi-ply separable textured yarn package (240).

Figure 6A:
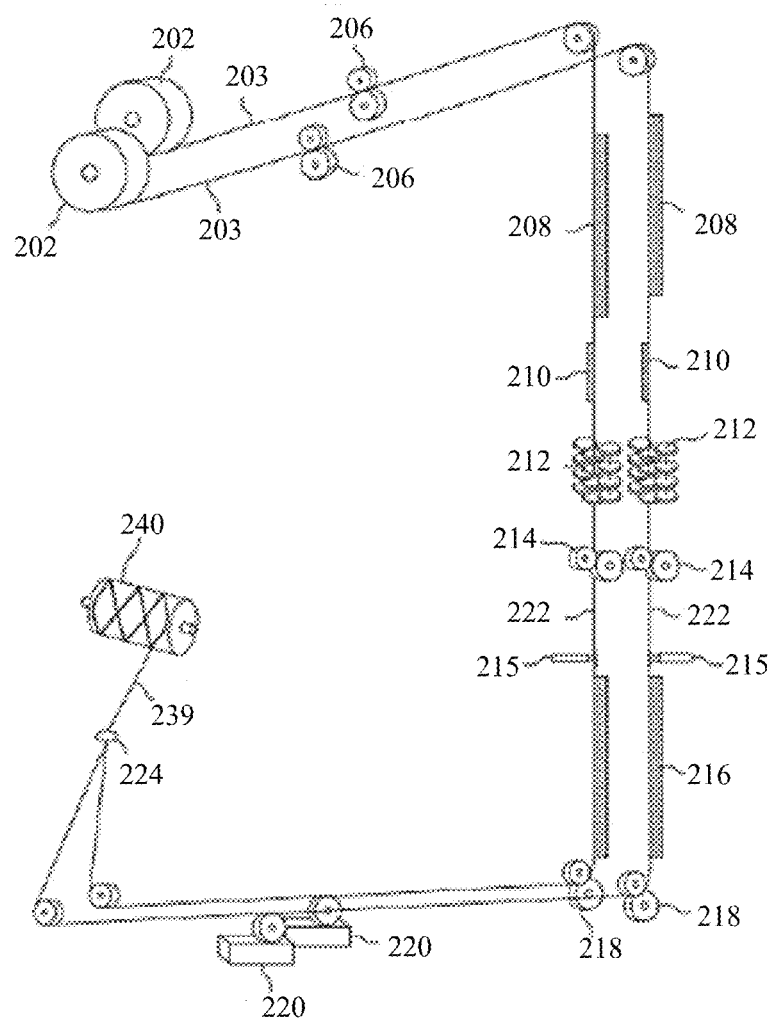
FIG. 6A, illustrate an example of manufacturing multi-ply separable textured yarn using a conventional system.

In FIG. 6A there are 2 spindles of texturizing machine and a 2 Ply Separable textured yarn package (240) is formed.

The production of a texturizing machine is given by the following formula at 100% Efficiency:

Production per day in Kgs=Number of bobbins
wound at a time*Denier of wound yarn*Speed
(m/min)*60 (min)*24 (hours)/9000000.

In a texturized machine if there are "X" number of spindles, then "X" number of bobbins would wound at a time if no plying is done in machine. If plying is done for making multi-ply separable texturized yarns, then the number of bobbins wound at a time is "X" divided by the number of plies 'n'. If 'n' ply separable textured are made having 'd' denier of each ply, then the number of textured yarn package that would be made at a time will be 'X/n'. This would require 'X' filament yarn packages. Further, the denier of the wound yarn would be d*n. Disadvantage associated with such process is that if one ply breaks, the other remaining ply or plies would also have to be broken, which is not efficient also process speeds are much slower for finer deniers of yarns.

The system/method of manufacturing recycled multi-ply, separable textured yarn, in accordance with the present invention, aims to resolve amongst other issues of low production and low productivity associated with conventional yarn manufacturing The present invention provides a method for manufacturing a recycled multi-ply separable textured yarn. The method includes passing a multi-ply separable interlaced filament yarn through a texturizing unit to form a multi-ply separable draw textured yarn, wherein the multi-ply separable interlaced filament yarn is formed from recycled polymers, wherein the recycled filament yarn is separable into at least two recycled separable interlaced filament yarn; wherein the interlacing of the filaments within each recycled separable interlaced filament yarn is retained during further processing of the yarn to fabric and in the fabric so that yarn ply of said recycled separable interlaced filament yarn is separable from other yarn plies in the fabric or passing two or more separable interlaced filament yarns.

Figure 6B:
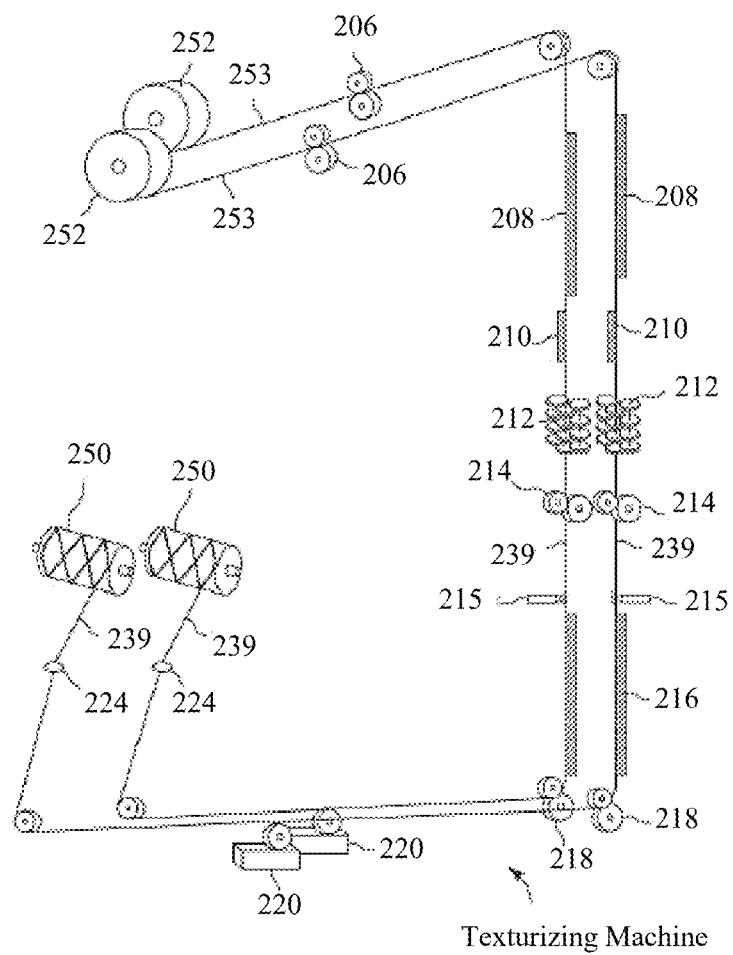
FIGS. 6B and 6C, illustrate an example of manufacturing multi-ply separable textured yarn in a productive manner using a system and method in accordance with the present invention.

As illustrated in FIG. 6B, 2 spindles of a texturizing machine are having an output 2 packages (250) of 2-ply recycled separable textured yarns (239) by using 2-ply recycled separable interlaced filament yarns (253) from 2 packages (252).

In one embodiment of the present invention, the recycled multi-ply separable interlaced filament yarn is formed by converging at least two recycled separable interlaced filament yarn.

Figure 6C:
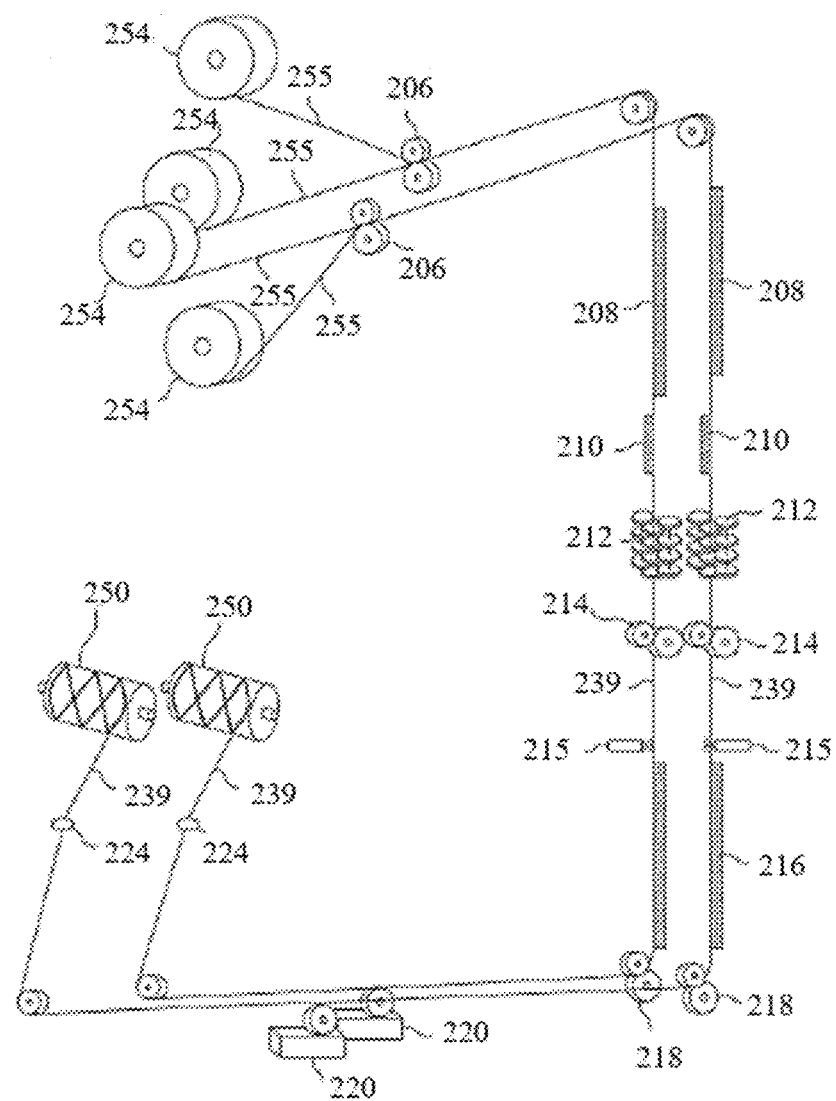

As illustrated in FIG. 6C, 2 spindles of a texturizing machine are having an output 2 packages (250) of 2-ply recycled separable textured yarns (239) by using 2-ply recycled separable interlaced filament yarn (253) from 4 packages of recycled separable interlaced filament yarn (252).

As illustrated in FIG. 6C, total 4 packages of recycled separable interlaced filament yarn are used on 2 spindles to form two numbers of 2-ply recycled separable textured yarns. Likewise, the output would be of 4-ply recycled separable textured yarns (239) per spindle if two numbers of 2-ply recycled separable interlaced filament yarn (255) would be used for each spindle and output would be 8-Ply recycled separable textured yarns (239) per spindle if two numbers 4-ply recycled separable interlaced filament yarn (255) would be used for each spindle.

The advantage in the present method of yarn manufacturing is due to the strong binding or interlacing of the filaments of each yarn ply of the resulting interlaced separable filament yarn formed from recycled polymers, which does not completely open and remains during the texturizing process and also the fabric after the fabric is made and finished. Further, each ply remains separate after texturizing and even in the fabric. Moreover, unlike the conventional textured yarn manufacturing process, here, it is important not to give high interlacing by interlacing jet (215) on the texturizing machine as all filaments of the plies of the yarn would get intermingled and would not remain separable.

To achieve less interlacing, in the present technique of manufacturing, either the fluid pressure is decreased, or the interlacing jet nozzle size is decreased. In a preferred embodiment, interlacing is carried out at fluid pressure up to 1 bar g having nozzle size of jet up to 1.4 mm in diameter.

The present method results in significant increase in production of textured yarns and results in huge cost saving as compared to the conventional process of plying the yarns in texturizing. Further, the efficiency is more in this process, as a ply breakage does not hamper the whole yarn. Furthermore, increased speeds are used as the denier to be processed per spindle increases.

In one embodiment of the invention, at least one multi-ply separable textured yarn formed from recycled polymers, is converged with at least one multi-ply separable textured yarn to increase the number of plies and denier.

FIGS. 7A, 7B and 7C illustrates a Table 1 in three parts (Table 1/3, 2/3, 3/3) which depicts a significant gain in Output and Capability by using the system and method of manufacturing in accordance with the present invention compared to the conventional way.

As per FIG. 7A, Table (1/3), in Column 7A1 for producing 20 Denier 2-ply separable interlaced textured yarn using the conventional method, a two 32 denier filament yarns having elongation in range of 125-150 as per conventional process are made at process speed of 3000 MPM and texturized on a texturized machine at draw ratio of 1.7 at process speed of 750 MPM to yield two textured yarn of 20 denier per spindle which are then highly interlaced and finally 2 textured yarns from 2 spindles are wound together on an tube. So an texturizing machine having 312 spindles would get an output of about 748 kgs per day at 100% efficiency as wound denier would be 40 and 156 bobbins would be wound at a time, and filament yarn machine consisting of 1 winder having 10 bobbin winding capacity would give an output of about 153 kgs at 100% efficiency as 10 bobbins would be wound at a time.

Now as using the method as per present invention as shown in column 7A2 with reference to FIG. 4, 10 Bobbins of separable interlaced filament yarn made from recycled polymers is very strong and is retained in further process and in fabric. 2 such separable interlaced filament yarn are texturized per spindle, (i.e. 624 yarns) on texturizing machine as shown in FIG. 6C and with an output of 312 packages winding at the same time of 2 ply separable textured yarns and the output is doubled about 1497 kgs as compared to the conventional process.

As shown column 7A3 by using the method as per present invention with reference to FIGS. 4A, 4B and 4C, 2-ply separable interlaced filament yarn of final denier 64 having two separable interlaced filament yarn of 32 denier. On texturizing machine with reference to FIG. 6B by using this filament yarn on 312 spindles, 20 denier 2-ply separable textured yarn would be wound on 312 tubes at a time and 312 packages would be formed at a time and output of texturize machine would double to about 1497 kgs at 100% efficiency and the same product would be formed. It is very essential that the interlacing on texturizing machine has to be nil or very low as high interlacing would mix the plies and would not result in separable textured yarns.

In column 7A4 in accordance with the present invention the filament yarn spinning capacity is doubled as shown with reference to FIG. 5A where the number of jets and other related parts are doubled and the same line will give double production as 20 numbers separable interlaced filament yarn are formed and wound in 2-ply on ten bobbins to form 10 packages of 2-ply separable interlaced filament yarn having final denier of 64. So, in 7A4 using the method of the present invention filament yarn and texturize production is doubled.

As per FIG. 7B, Table (2/3), in column 7B1 for producing 20 denier 4-ply separable textured yarns using the conventional method the filament yarn is made using conventional method as in column 7A1. 4 filament yarns are wound together after texturizing in a package resulting in 78 packages formed at a time with winding denier being 80 (20×4). The output remains the same as 7A1. Now using the method as shown in present invention with reference to filament yarn produced in column 7A3, yarn from 2 packages of 2-ply separable interlaced filament yarn having total denier of 64 per yarn package is fed to an spindle of texturizing machine with reference to FIG. 6C, total fed denier being 128 per texturizing spindle results in 4-ply separable textured yarns being produced at all 312 spindles at a time and the texturizing production is quadruple compared to conventional way of 7B1.

In column 7B3 with regards to filament yarn, the process as in column 7A4 is carried out except that 20 numbers separable interlaced filament yarn each having denier of 32 are wound in a groups of 4 on the winder using 5 bobbins to create 4-Ply separable interlaced filament yarn having wound denier 128. And in Column 7B4 with reference to FIG. 5C using 40 Jets 40 numbers of separable interlaced filament yarn each having denier of 32 are wound on 10 bobbins to get 4-ply separable interlaced filament yarn in accordance with the present invention and output is quadrupled for filament yarn. The filament yarn produced as per column 7B3 and 7B4 is loaded on the texturizing machine as shown with reference to FIG. 6C for one per spindle and at the output is 4-ply separable DTY having total denier. Thus, the texturizing production is quadrupled compared to the conventional method as shown in column 7B1.

As per FIG. 7C, Table (2/3) in column 7C1 for producing 10 denier 4-ply separable interlaced filament yarn, 16 denier of separable interlaced filament yarn would be required. To produce 16 denier yarn, the line output would be about 78 kgs and it is assumed that the line has a minimum capacity of 150 kgs per day. So, it would not be possible to produce the filament yarn for 10 denier unless changes are made to reduce its capacity by changing the melt line size, reducing melt pump capacity, reducing residence time, etc. Now by using the method in accordance with the present invention for preparing 4-ply separable interlaced filament yarn formed from recycled polymers, the number of interlacing jets is increased to 2 times or 4 times as shown in Column 7C2 with respect to FIG. 5B and Column 7C3 with respect to FIG. 5C respectively and an output for 16 denier 4-ply separable interlaced filament yarn having total denier of 64 denier with each separable interlaced filament having denier of 16. This filament yarn when used on texturizing machine in accordance with the present invention as shown in column 7C2 and 7C3 would give an output of 4 times compared to the output possible using conventional method as shown in column 7C1.

Likewise, more the number of plies more the output would be possible for a particular denier of yarn. The examples shown are in illustration and figures are with respect to 2-ply and 4-ply. Using the method as per present invention it is possible to make any number of plies including 3-ply, 5-ply, 10-ply, 40-ply, 100-ply, etc. and the production would be increasing manifold in texturizing and at filament yarn stage.

In another embodiment, it is provided that the in order to know the thread count in any fabric, it is important to understand that thread count is the number of threads woven into one square inch of fabric. This number is based on the threads woven horizontally which is called as "weft" and vertically which is called as "warp". Weft insertions in a fabric are called as "picks". Therefore, the thread count is increased by using multi-ply separable draw textured yarns and inserting in the weft. In order to understand this, let's consider an example where a thread count of 1100 could be formed by taking 200 yarns per inch of any material in the warp say 50 s cotton and inserting in weft 75 picks per inch in the weft and each pick will have 12 ply separable textured yarn. Thus, the weft would have 900 (75×12) yarns per inch and total thread count is 1100 (900+200).

Likewise, consider another example where a thread counts of 3000 could be formed by taking 280 yarns per inch of any material in the warp say 80 s cotton and inserting in weft 68 picks per inch in the weft and each pick will have 40 ply separable textured yarn. Thus, the weft would have 2720 (68×40) yarns per inch and total thread count is 3000 (2720+280).

Figure 8:
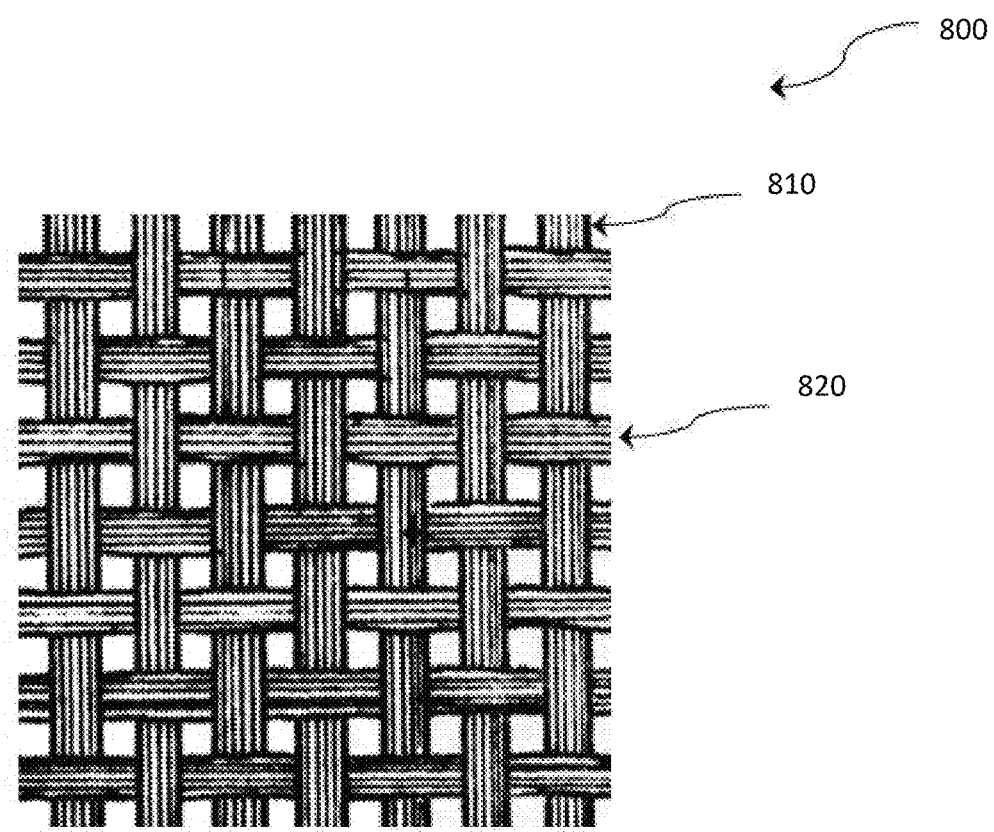
FIG. 8 illustrates a textile (800) showing a plurality of warps, and a plurality of weft in the textile.

FIG. 8 illustrates a high thread/yarn count woven textile fabric showing a plurality of warps (810), and a plurality of weft (820) in the textile (800).

In the FIG. 8, a high thread/yarn count woven textile fabric (800) is provided. The fabric (800) includes a plurality of warps (810), and a plurality of weft (820). The high thread/yarn count woven textile fabric (800) usually have 250 to 3000 picks per inch in the weft (820). In another exemplary embodiment, the high thread/yarn count woven textile fabric (800) may include up to 6000 picks per inch in the weft (820). Further, the at least two recycled separable multi-filament parallel yarn picks are woven in groups together in the weft (820). Furthermore, the recycled separable multi-filament parallel picks are separable from other picks, and the denier of the recycled separable multi-filament yarn may be in the range of 5 to 50. Therefore, the thread/yarn count of the fabric (800) can be in the range between 400 to 3000, which may go up to 6000.

The preferred embodiment does not limit the scope and ambit of the invention. The description provided is purely by way of example and illustration.

TECHNICAL ADVANCEMENTS AND ECONOMIC SIGNIFICANCE

The technical advancements offered by the method of manufacturing yarns disclosed in the present invention are as follows:

- The Conventional products that are made till date in superfine yarns are of Virgin Polymer which are originating from Crude oil sources and not eco-friendly.
- With the growing consciousness of saving the environment, it would be excellent that an eco-friendly product is produced which does not use virgin polymer.
- Very high output of recycled multi-ply separable filament yarn.
- Very high output of recycled multi-ply separable textured yarns.
- Very high efficiency as compared to conventional system/method in textured and filament yarn.
- Much stable process.
- Increased capability to produce super-fine/low and ultra-fine/low denier recycled multi-ply separable textured yarns.
- Reduction in wastage and increased speeds of processing recycled yarns
- Very low costs of producing recycled multi-ply separable interlaced filament yarn and recycled multi-ply separable textured yarn.
- Very low capital cost involved in increasing output.
- Better quality recycled yarns.
- More plies in recycled multi-ply separable textured yarns.
- Increasing plies in recycled multi-ply separable textured yarn results in decreasing cost instead of increasing cost.
- Highest possible quality of recycled yarns with minimal cost involvement.
- The filament yarn disclosed in the present invention is formed from recycled polymers. Energy required to make a recycled polymer is less energy than energy required for virgin polyester.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form a part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

While considerable emphasis has been placed herein on the components and component parts of the preferred embodiments, it will be appreciated that many embodiments can be made and that many changes can be made in the preferred embodiments without departing from the principles of the invention.

The foregoing description of the specific embodiments will so fully reveal the general nature of the embodiments herein that others can, by applying current knowledge, readily monofilament yarn and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification

The invention claimed is:

1. A group of recycled separable multi-filament parallel yarns, the group comprising: at least two recycled separable interlaced multi-filament parallel yarns,
    wherein each yarn is a group of interlaced textured multiple filaments,
    wherein the recycled separable multifilament parallel yarns consist of material selected from the group consisting of recycled polyester, recycled polyamide, recycled polypropylene and recycled polylactic acid;
    wherein a denier of said yarn ranges from 5 to 30;
    wherein the filaments of the said yarn are intermingled;
    wherein the nips per meter of the said yarn is in range of 15 to 150;
    wherein the filaments of said yarns are in the range of 5 to 35, and
    wherein said recycled separable multi-filament parallel yarns are separable from other yarns, and
    wherein the interlacing of the filaments within each separable interlaced filament yarn is retained during further processing of the yarn to fabric and in the fabric so that the yarn is separable from other yarns in the fabric.

2. The group of recycled separable multi-filament parallel yarns of claim 1, wherein said recycled separable multifilament parallel yarns are selected from the group consisting of partially oriented yarn (POY), medium oriented yarn (MOY), fully oriented yarn (FOY), and draw textured yarns (DTY).

3. A high thread/yarn count woven textile fabric comprising:
    a plurality of warps, and
    a plurality of wefts;
    wherein said fabric having 250 to 3000 picks per inch in the weft;
    wherein at least two recycled separable interlaced multi-filament parallel yarn picks are woven in groups together in the weft;
    wherein each yarn is a group of interlaced textured multiple filaments,
    wherein said recycled separable multifilament parallel picks consist of material selected from the group consisting of recycled polyester, recycled polyamide, recycled polypropylene and recycled polylactic acid;
    wherein said recycled separable multi-filament parallel picks are separable from other picks;
    wherein a denier of said recycled separable multi-filament yarn is range from 5 to 50, and
    wherein the thread/yarn count of said fabric is in between 400 to 3000, and
    wherein the interlacing of the filaments within each separable interlaced filament yarn is retained during further processing of the yarn to fabric and in the fabric so that the yarn is separable from other yarns in the fabric.

4. The high thread/yarn count woven textile fabric of claim 3, wherein said recycled separable multifilament parallel picks are selected from the group consisting of partially oriented yarn (POY), medium oriented yarn (MOY), fully oriented yarn (FOY), and draw textured yarns (DTY).

5. A bedding comprising the high thread/yarn count woven textile fabric of claim 3.

* * * * *